United States Patent [19]

Martin et al.

[11] 4,247,900
[45] * Jan. 27, 1981

[54] SIGNAL COMBINER WITH PERMUTED ADDRESSING

[75] Inventors: Walter J. Martin, Portsmouth; John Furtado, Tiverton, both of R.I.

[73] Assignee: Raytheon Company, Lexington, Mass.

[*] Notice: The portion of the term of this patent subsequent to Aug. 15, 1995, has been disclaimed.

[21] Appl. No.: 918,614

[22] Filed: Jun. 23, 1978

Related U.S. Application Data

[62] Division of Ser. No. 746,276, Dec. 1, 1976, Pat. No. 4,107,685.

[51] Int. Cl.³ .................. G01S 3/80; H04B 11/00
[52] U.S. Cl. .................. 364/581; 343/100 SA; 364/715
[58] Field of Search .................. 340/6 R, 16 R; 343/100 SA, 100 CL, 5 DP; 364/200, 715, 724, 728, 736, 768, 581

[56] References Cited

U.S. PATENT DOCUMENTS

| | | | |
|---|---|---|---|
| 3,593,313 | 7/1971 | Tomaszewski et al. | 364/200 |
| 3,717,756 | 2/1973 | Stitt | 364/728 |
| 3,822,404 | 7/1974 | Croisier et al. | 364/724 |
| 4,014,023 | 3/1977 | Kirkland | 340/6 R |
| 4,025,772 | 5/1977 | Constant | 364/724 |
| 4,062,060 | 12/1977 | Nussbaumer | 364/724 |
| 4,063,082 | 12/1977 | Nussbaumer | 364/728 |
| 4,081,858 | 3/1978 | Koblasz et al. | 364/728 |
| 4,093,989 | 6/1978 | Flink et al. | 364/724 |
| 4,107,685 | 8/1978 | Martin et al. | 340/16 R |

*Primary Examiner*—Charles E. Atkinson
*Assistant Examiner*—Gary Chin
*Attorney, Agent, or Firm*—Joseph D. Pannone; Milton D. Bartlett; Herbert W. Arnold

[57] ABSTRACT

A system for forming a beam of radiant energy which is incident upon or radiated from an array of radiating elements such as sonar transducers. As a wavefront progresses across the array, samples of signals received by individual ones of the transducers are selected in accordance with specific beams to be formed, the selected samples being summed together through a sequence of partial summations until a complete summation of a sample of a beam is obtained. The sequence of partial summations is initiated successively for each output sampling interval. For a long array, wherein the transit time of a wavefront across the array is longer than the intersample interval, a plurality of the sequences are generated concurrently. All partial sums for all beam samples are generated periodically at the output sampling rate and are stored in a memory. The address of the memory is permuted at a rate of one memory section per output sample interval whereby a presently calculated partial sum is combined with the partial sum of an earlier sequence.

7 Claims, 13 Drawing Figures

| SLOT →<br>↓ TIME | SLOT No.1 | SLOT No.2 | SLOT No.3 | SLOT No.4 | SLOT No.5 | SLOT No.6 | SLOT No.7 | SLOT No.8 | SLOT N.9 | SLOT N.10 |
|---|---|---|---|---|---|---|---|---|---|---|
| OUTPUT SAMP. INT. No.1 | +F; CLEAR I | B+A +C+D +E I | B+A +C+D I | B+A +C I | | | | | | |
| OUTPUT SAMP. INT. No.2 | | +F; CLEAR I | B+A +C+D +E I | B+A +C+D I | B+A +C I | | | | | |
| OUTPUT SAMP. INT. No.3 | | | +F; CLEAR I | B+A +C+D E I | B+A +C+D I | B+A +C I | | | | |
| OUTPUT SAMP. INT. No.4 | | | | +F; CLEAR I | | | | B+A +C I | | |
| OUTPUT SAMP. INT. No.5 | | | | | +F; CLEAR I | | | B+A +C I | | |
| OUTPUT SAMP. INT. No.6 | | | | | | +F; CLEAR I | | B+A +C I | | |
| OUTPUT SAMP. INT. No.7 | | | | | | | +F; CLEAR I | | B+A +C I | |
| OUTPUT SAMP. INT. No.8 | B+A +C I | | | | | | | +F CLEAR I | B+A +C+D +E I | +B+A +C+D I |
| OUTPUT SAMP. No.9 | B+A +C+D I | B+A +C I | | | | | | +F; CLEAR I | B+A +C+D +E I |

STORAGE OF PARTIAL SUMS

*FIG. 7*

|  | SLOT NO.1 | SLOT NO.2 | SLOT NO.3 | SLOT NO.4 | SLOT NO.5 | SLOT NO.6 | SLOT NO.7 | SLOT NO.8 | SLOT NO.9 | SLOT NO.10 |
|---|---|---|---|---|---|---|---|---|---|---|
| OUTPUT SAMP INT NO.1 | +F CLEAR I | B+A +C+D +E I | B+A +C+D I | B+A +C I | +F; CLEAR II | B+A +A+D II | B+C +A+D II | +A+F; CLEAR III | C+D +B+E III | EXTRA |
| OUTPUT SAMP INT NO.2 | EXTRA | +F; CLEAR I | B+A +C+D +E I | B+A +C+D I | B+A +C I | +F; CLEAR II | B+C +A+D +E II | B+C +A+D II | +A+F; CLEAR III | C+D +B+E III |
| OUTPUT SAMP INT NO.3 | C+D +B+E III | EXTRA | +F; CLEAR I | B+A +C+D +E I | B+A +C+D I | B+A +C I | F; CLEAR II | B+C +A+D E II | B+C +A+D II | +A+F; CLEAR III |
| OUTPUT SAMP INT NO.4 | +A+F CLEAR III |  |  | +F; CLEAR I | B+A +C+D +E I |  |  |  |  | B+C +A+D II |
| OUTPUT SAMP INT NO.5 | B+C +A+D II | +A+F; CLEAR III |  |  | +F; CLEAR I | B+A +C+D +E I |  |  |  |  |
| OUTPUT SAMP INT NO.6 |  | B+C +A+D II | +A+F; CLEAR III |  |  | +F; CLEAR I | B+A +C+D +E I |  |  |  |
| OUTPUT SAMP INT NO.7 |  |  | B+C +A+D II | A+F; CLEAR III |  |  | +F; CLEAR I | B+A +C+D +E I |  |  |
| OUTPUT SAMP INT NO.8 | B+A +C I | +F; CLEAR II | B+A +A+D +E II | B+C +A+D II | +A+F; CLEAR III | C+D +B+E III | EXTRA | +F; CLEAR I | B+A +C+D +E I | B+A +C+D I |
| OUTPUT SAMP INT NO.9 | +B+A +C+D I | B+A +C I | +F; CLEAR II | B+C +A+D +E II | B+C +A+D II | +A+F; CLEAR III | C+D +B+E III | EXTRA | +F; CLEAR I | B+A +C+D +E I |

STORAGE OF PARTIAL SUMS

*FIG. 8*

| SLOT → / ↓ TIME | SLOT NO. 1 | SLOT NO. 2 | SLOT NO 3 | SLOT NO 4 | SLOT NO 5 | SLOT NO 6 | SLOT NO 7 | SLOT NO 8 | SLOT NO 9 | SLOT N 10 |
|---|---|---|---|---|---|---|---|---|---|---|
| OUTPUT SAMP INT NO.1 | ADD F; CLEAR I | ADD E I | ADD D I | ADD B+A+C I | ADD F; CLEAR II | ADD E II | ADD B+C +A+D II | ADD A+F; CLEAR III | ADD C+D +B+E III | NONE |
| OUTPUT SAMP INT NO. 2 | ADD F; CLEAR I | ADD E I | ADD D I | ADD B+A+C I | ADD F; CLEAR II | ADD E II | ADD B+C +A+D II | ADD A+F CLEAR III | ADD C+D +B+E III | NONE |
| OUTPUT SAMP INT NO. 3 | ↓ | ↓ | ↓ | ↓ | ↓ | ↓ | ↓ | ↓ | ↓ | ↓ |
| OUTPUT SAMP INT NO. 4 | | | | | | | | | | |
| OUTPUT SAMP INT NO. 5 | ↓ | ↓ | ↓ | ↓ | ↓ | ↓ | ↓ | ↓ | ↓ | ↓ |
| OUTPUT SAMP INT NO. 6 | ADD F; CLEAR I | ADD E I | ADD D I | ADD B+A+C I | ADD F; CLEAR II | ADD E II | ADD B+C +A+D II | ADD A+F CLEAR III | ADD C+D +B+E III | NONE |

PARTIAL SLOT ADDRESS

*FIG. 9*

SIGNAL COMBINER WITH PERMUTED ADDRESSING

CROSS REFERENCE TO RELATED APPLICATION

This application is a division of application Ser. No. 746,276 filed Dec. 1, 1976, now U.S. Pat. No. 4,107,685 which issued Aug. 15, 1978.

BACKGROUND OF THE INVENTION

This invention relates to a system for combining signals of an array of electromagnetic radiating elements or sonar transducers to form a beam of electromagnetic or sonic energy and, more particularly, to a system which forms beams in a plurality of directions relative to the array. In the ensuing description, the term transducers will be utilized since the preferred embodiment of the invention was implemented in a sonar system. However, it is understood that the description applies also to the forming of beams of electromagnetic energy and that the term transducer includes radiating element for an implementation of the invention in a radar system.

An array of transducers is often employed for receiving and transmitting sonic radiant energy. Receiving beams of the radiant energy are formed by combining signals of the transducers by preserving the relative phase shifts of signals induced by a wavefront of radiant energy propagating across the array. In the case of long arrays, long in the sense that the time for a wavefront of radiant energy to pass across the array is longer than the reciprocal of the rate at which data is to be extracted from the received radiant energy, the arithmetic operations involving the combining of the signals of the radiating elements or transducers to produce an output sample of data are only partially completed when the arithmetic operations are begun for the next output sample of data.

This situation is most readily seen in the case of a sonar transducer array utilized in forming a transmitting or a receiving beam of sonic energy. Considering, by way of example, a sonar receiving array which is sufficiently long such that several milliseconds elapse as a wavefront of radiant energy propagates across the array, and considering further that data is to be extracted from the array at a rate of several kilohertz, it is apparent that many output samples of data must be extracted during the time elapsed by the wavefront in propagating across the array. In an array configuration wherein transducers are arranged along a straight line, a plane wavefront arriving broadside is incident upon all the transducers simultaneously while a plane wavefront incident in the endfire direction is incident sequentially upon each of the transducers. A wavefront incident obliquely upon the array propagates across the array in less time than the propagation time of the wavefront in the end-fire direction. Thus, it is seen that the time in which the transducer signals are combined to form a single sample of output data varies with the direction of the incident wavefront relative to the array.

A problem arises when the foregoing sonar array is utilized for gathering data from many directions, it being desirable to form beams in each of the many directions. The problem arises by virtue of the numerous arithmetic operations required for forming each output sample of data for each beam, a succession of the samples being provided for each direction in which a beam is to be formed. A problem arises in the timing of these arithmetic operations in view of the fact that the time elapsed during the computation of an output sample varies from a time interval shorter than the interval between successive output samples to a time which is longer than many of such output sample intervals. This variation occurs, as noted hereinabove, in accordance with the various directions of propagation of radiation relative to the array. With the large arrays utilized in highly directive sonar systems and the relatively high data rates often used by modern sonar systems, the necessary computations for forming beams in a multiplicity of directions and for extracting data therefrom may well require computers which are too large to be readily accommodated aboard a small ship, both in terms of the physical size of the computer equipment as well as in terms of the personnel required to service and operate the computer equipment.

In addition, there is a problem of synchronization of the sampling of the transducer signals with the aforementioned computations. The transducer signals are sampled at a sufficiently high input sampling rate, for example, ten samplings during the interval of time that a sound wave propagates a distance of one wavelength, to ensure that beams are formed with little or no grating lobes and grating nulls; thus, the sampling of the input transducer signals need be accomplished at a rate which is usually higher than the rate at which the output samples are produced for any one beam.

SUMMARY OF THE INVENTION

The aforementioned problems are overcome and other advantages are provided by a beam forming system utilizing an array of transducers and which, in accordance with the invention, comprises a sampler of transducer signals for providing input samples to the system, an arithmetic unit coupled to the sampler for summing together samples of the transducer signals, and a memory coupled to the arithmetic unit for storing sums of the signal samples.

As a wavefront of sonic energy propagates past the array, the wavefront is sequentially incident on individual ones of the transducers of the array. The time elapsed during the transit of the array by the wavefront depends on the arrangement of the transducers relative to the direction of propagation of the wavefront. Thus, by way of example, a wavefront incident broadside upon a line array reaches each transducer simultaneously, while the wavefront incident in the endfire direction along the array requires a maximum transit time to pass by the array and reaches each transducer sequentially. In the case of oblique incidence upon the array, the transit time is less than that of the case of endfire incidence, and the intervals between the impingement of the wavefront successively upon the individual transducers is similarly reduced.

The beam forming system of the invention produces output samples of data for each beam to be formed from the input samples of the transducer signals. The rate of occurrence of the output samples for any one beam is selected in accordance with the spectrum and data rate of the signal transmitted along that beam and is invariant with the transit time of sonic energy across the array.

In the forming of an output sample for a beam oriented obliquely to the line array, the summations of the input samples occur sequentially with a partial sum being produced after the wavefront has impinged on two of the transducers, the partial sum including more and more terms as the wavefront progresses across further ones of the transducers. A complete summation is obtained after a complete traversal of the array by the wavefront. Thus, it is seen that the time required to complete a summation and thereby produce an output sample depends on the transit time of a wavefront across the array.

The time between output samples, as seen hereinabove, depends on the data rate, and may well be smaller than the transit time. Accordingly, a sequence of partial summations for a second, a third and possibly more output samples of a set of output samples may be initiated prior to the completion of the sequence of partial summations for the first output sample of the set of output samples.

It is noted that the order of selection of input samples of the signals from the various transducers for the production of an output sample for a specific beam is the same for every output sample of that beam. Since the sequence of partial summations for one output sample may be generated concurrently with that of a succeeding output sample, it is seen that different portions of the sequence, or subsequences, of the partial summations occur during each output sample interval, one subsequence being for a first of the output samples with a second subsequence being for a second of the output samples.

In accordance with the invention, each of the foregoing subsequences is performed by the arithmetic unit with the partial summations being stored in the memory. The memory addresses are permuted such that during each succeeding output sample interval, the addresses of partial sums stored in the memory are advanced by one section of the memory. Thereby, the partial summations obtained during successive occurrences of one of the foregoing subsequences are combined with succeedingly later occurring output samples. Also, the arithmetic section is able to operate in an iterative procedure which is periodic at the output sample rate, even though the completion of a summation for an output sample may require an interval of time which is greater than the interval of time between output samples of a specific beam.

A preferred embodiment of the invention includes an address generator which is preprogrammed for a specific array format and a specific set of beam directions to sequentially select the input samples provided by the sampler, and to apply these samples to the arithmetic unit and the resulting partial summations to the memory. Also included is a data processor for providing filtering or correlation of the output samples, and a display coupled to the data processor for displaying the data received from each of the beams. The arithmetic unit may also include weighting circuitry for weighting individual ones of the input samples to adjust the shape of the radiation patterns of each of the beams.

There is also disclosed an analogous embodiment of the invention for the transmission of sonic energy wherein signal samples are extracted from a memory, the addresses of the memory being permuted, to be coupled to an array of transducers for generating beams of sonic energy in a plurality of directions. In this analogous embodiment, the foregoing combination of transducer signals by the arithmetic unit is deleted; however, the timing, synchronization, and permutation follows that of the previous embodiment for forming receiving beams.

BRIEF DESCRIPTION OF THE DRAWINGS

The aforementioned aspects and other features of the invention are explained in the following description taken in connection with the accompanying drawings wherein:

FIG. 7 is a timing diagram showing the contents of sections, or slots, of the memory of FIG. 3 for concurrent partial summations utilized in providing output samples of a beam directed along the propagation path of the first wave of FIG. 6, a permutation of addresses being evidenced by the advancement of a partial sum to the next slot at the conclusion of an output sample interval;

FIG. 8 again discloses the timing diagram of FIG. 7 but also includes the contents of other slots within the memory utilized in providing output samples of beams directed along the propagation paths of the second and the third waves of FIG. 6;

FIG. 9 is a timing diagram of an iterative procedure of the arithmetic operations provided by an adder, a multiplier, and a programmable number generator of FIG. 3, FIG. 9 showing a partial slot address for each combination of signals of transducers prior to the permutation of addresses for the memory of FIG. 3;

PREFERRED EMBODIMENT OF THE INVENTION

Figure 1:
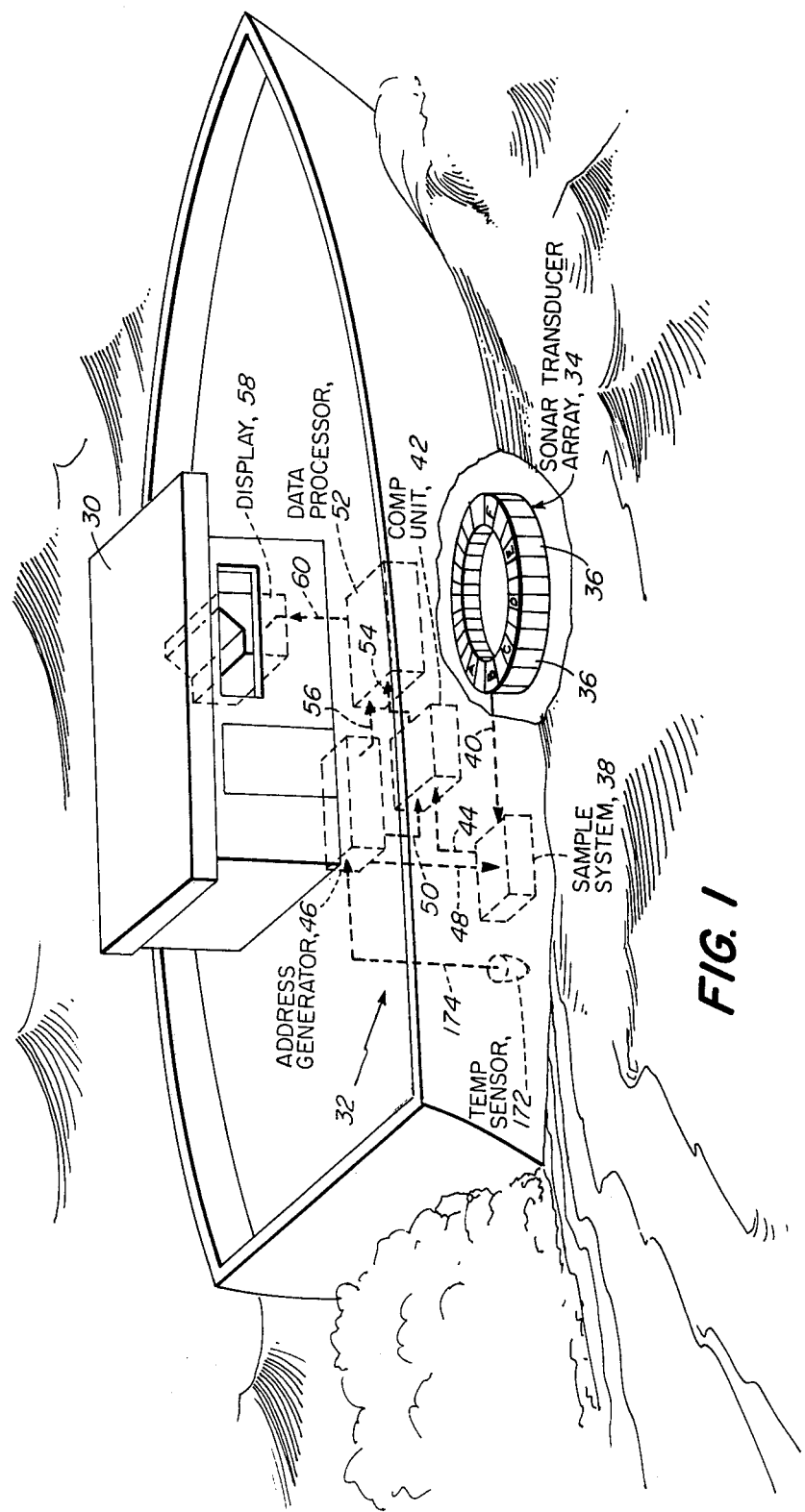
FIG. 1 is a stylized pictorial view of a ship including the components of a sonar system incorporating the invention, the ship being cut away to show a transducer array mounted on the hull of the ship.

Referring now to FIG. 1 there is seen a ship 30 carrying a sonar system 32 which, in accordance with the invention, includes an array 34 of transducers 36 with individual ones of the transducers 36 being identified by the letters A-F, a sampling system 38 shown in dotted lines to indicate its being hidden in the hull of the ship 30 and being coupled via line 40 to the array 34, a computation unit 42 coupled via line 44 to the sampling system 38, an address generator 46 coupled via lines 48 and 50 respectively to the sampling system 38 and the computation unit 42, a data processor 52 shown coupled via lines 54 and 56 respectively to the computation unit 42 and the address generator 46, and a display 58 which is partially seen through a window of the ship's cabin and is coupled via line 60 to the data processor 52.

The array 34 may have any one of a number of convenient shapes such as a straight line or of two straight lines arranged in the manner of a cross, or as is shown in the figure, in the shape of an ellipse with the major axis thereof being parallel to the keel of the ship 30. The elliptical shape of the array 34 is advantageous for teaching the invention, provides good azimuthal coverage, and permits the water of the ocean to flow with substantially laminar flow lines past the ship 30 and a housing (not shown) of the array 34. The six transducers A-F have been selected for demonstrating the sequential incidence of a wavefront of radiation upon the elements of the array 34, the total time required for a wavefront to propagate past the six lettered transducers 36 varying with the direction of the incident wavefront.

Figure 2:
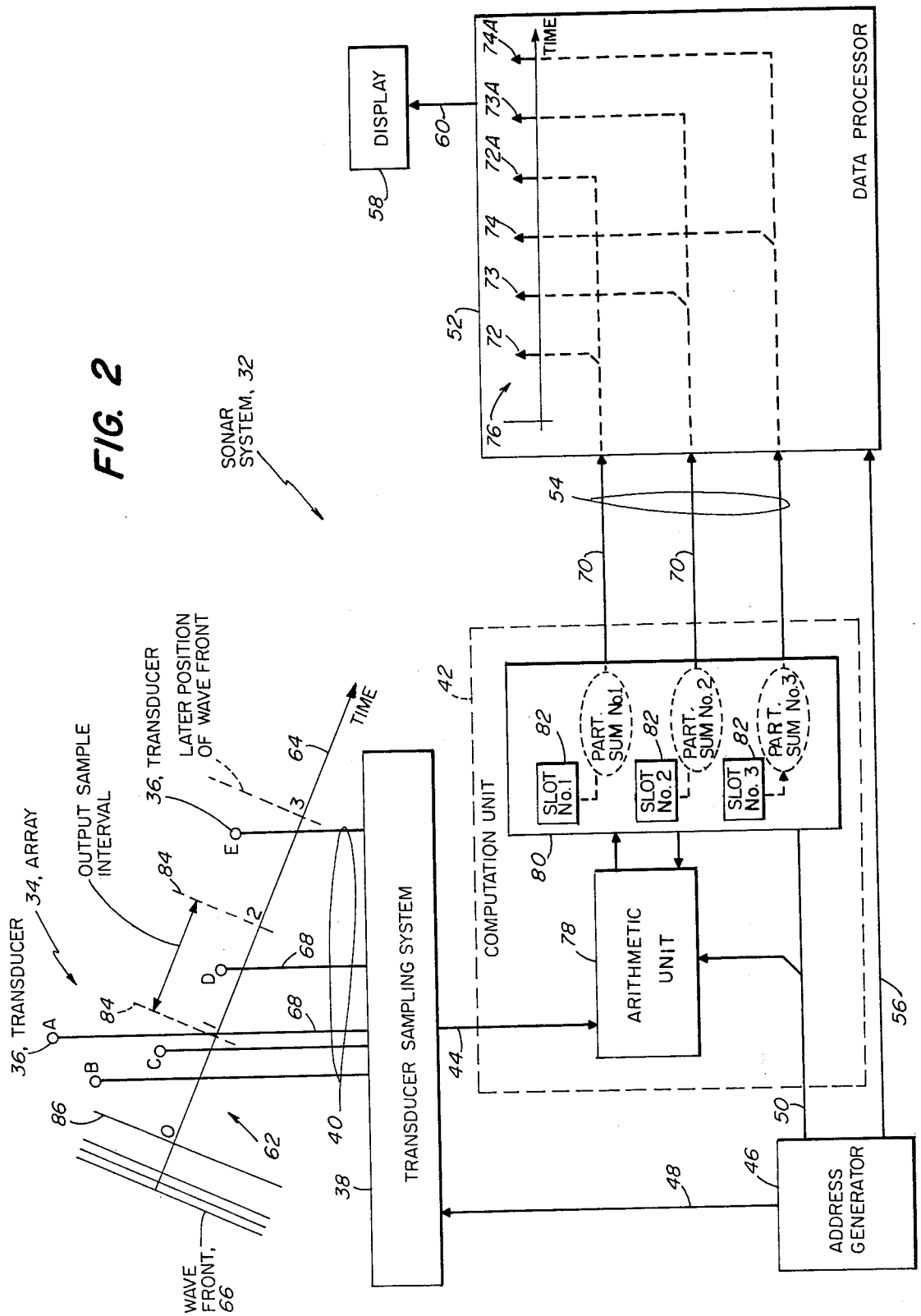
FIG. 2 is a simplified block diagram of the sonar system of FIG. 1 disclosing the arithmetic unit and the memory of a computation unit in accordance with the invention.

Referring now to FIG. 2, there is seen a block diagram of the sonar system 32 of FIG. 1, the figure showing a portion of the array 34, this portion having five of the transducers 36, namely the transducers labeled A-E. The figure also shows the sampling system 38, the computation unit 42, the address generator 46, the data processor 52 and the display 58 of FIG. 1. Superposed upon the array 34 is a graph 62 having an axis 64 for measuring intervals of elapsed time and oriented in the direction of propagation of a wavefront 66 across the array 34. The line 40 is seen to comprise a plurality of wires 68 for conducting signals from the transducers 36 to the sampling system 38. Also, the line 54 is seen to comprise a plurality of wires 70 for schematically representing the conduction of output samples of beam data from the computation unit 42 to the data processor 52, the output samples being shown therein by marks 72, 73 and 74 and marks 72A, 73A and 74A appearing upon a graph 76. The computation unit 42 is seen to comprise an arithmetic unit 78 and a memory 80 with slots 82 therein for storing partial summations of input samples of transducer signals for providing the aforementioned output samples.

Referring now to graph 62, the wavefront 66 is seen to reach transducer B first, followed by transducer A, and then the transducers C, D and E in that order. Dashed lines 84 show sequential locations of the wavefront 66 and are spaced apart along the axis 64 by intervals of time equal to the intersample interval of the output samples. The vertical axis 86 shows the beginning of the first output sample interval, at time equal to zero, with the numerals on the time axis 64 representing the conclusions of the successive output sample intervals. It is seen that during the first output sample interval the transducers B, A and C receive the wavefront 66, that the transducer D does not receive the wavefront 66 until the second output sample interval and that the transducer E does not receive the wavefront 66 until the third output sample interval. Thus, in order to provide an output sample for a beam of radiation directed along the axis 64 from signals of the transducers A-E, input samples must be gathered over a period of time equal to three output sample intervals.

By way of example, in the case of a sonar transducer array submerged in the ocean and having a length of approximately 1½ meters, a sonic wavefront propagates past the array in 1 millisecond. Assuming that data from the sonar system is required at a rate of 4 kHz, the Nyquist sampling rate is 8 kHz and, accordingly, output samples to the data processor 52 would be provided at a rate, somewhat greater than the Nyquist rate, of approximately 10 kHz. Considering the relationship between the output sample rate of 10 kHz and the elapsed time of 1 millisecond during which the wavefront 66 would propagate across the array 34, it is apparent that ten output samples would be provided during the time elapsed for the wavefront 66 to propagate past the array 34. For ease in teaching the invention, it is presumed in FIG. 2 that a lower output sample rate is utilized, such as four output samples during a traversal of the array 34 by the wavefront 66. The graph 62 shows only a portion of the array 34 having the transducers A-E, that portion being traversed in but three output sample intervals.

With respect to the graph 76 in the data processor 52 and the marks 72, 73 and 74 which represent three output samples occurring respectively at the ends of three successive output sample intervals, it is seen that three separate arithmetic operations are occurring concurrently to produce the three output samples. During the first interval of graph 62, a signal provided by transducer B in response to the incident wavefront 66 is combined with a signal from transducer A, the sum of these two signals then being combined with a signal from transducer C. During the following interval, the sum of these three signals is combined with a signal of transducer D and, during the next interval, the sum of the four signals is combined with the signal of the transducer E. It is apparent that during the second interval, when the sum of the first three signals is being combined with the signal of transducer D to provide the partial sum of an output sample, a combining operation has already begun for a partial sum of the next output sample, namely, the combining of the signals that were produced by the transducers A, B and C during the second interval. At the same time, an earlier partial sum is being combined with a signal of transducer E to produce a complete output sample.

As seen hereinabove, the computation unit 42 provides for concurrent combination of input samples of the transducer signals to produce the output samples via the memory 80 which has the individual memory slots 82. During an individual one of the output sample intervals, one slot 82 is used for the partial sum of one of the output samples, a second slot 82 is used for a second of the output samples while a third slot 82 is used for the third of the concurrently computed output samples. As will be explained hereinafter, the addresses of the slots 82 are shifted from one slot to the next at the conclusion of each output sample interval whereby the arithmetic section 78 can add the next transducer signal to the present value of a partial sum.

In the graph 76 the mark 72 is seen coupled by a wire 70 to a first one of the slots 82, the partial sum therein appearing sequentially in the first, the second, and the third of the slots 82. Similarly, the marks 73 and 74 are coupled respectively to the second and the third slots 82, the partial sum of the latter being completed during the third output sample interval. The graph 76 shows that the mark 72 occurs prior to the mark 73 which, in turn, occurs prior to the mark 74. The first memory slot 82 retains the partial sum of the signals of the transducers A, B, C and D until such time as the signal of transducer E is summed therewith, at which time the data represented by the mark 72 becomes available. At the same time, the second slot 82 is storing the partial sum of the signals of the transducers A, B and C to be combined with the signal of transducer D, and the third of the slots 82 is utilized in forming the sum of the signals of the transducers A, B and C. In this way, the data represented by the mark 73 becomes available from the second partial sum one output sample interval later than the data of the mark 72, while the data of the mark 74 is obtained two sample intervals after the data of the mark 72.

When the output sample represented by the mark 72 has been obtained, the first of the partial summations is initiated again for forming the partial sum of the signals of the transducers A, B and C. Thus, three separate sequences of summation of input samples provides all of the output samples. The fourth mark of the graph 76, represented by the legend 72A, is provided by a summation in the first slot 82 as in the forming of the data of the mark 72. Similarly, the marks 73A and 74A utilize respectively summations of the second and third slots 82 as do the marks 73 and 74. In the situation wherein there is an elapsed time of four output sample intervals during the progress of the wavefront 66 of the aforementioned beam across the entire array 34, it is apparent that four concurrent sequences of summation are utilized in providing the output samples of that particular beam. This will be further demonstrated with reference to the ensuing figures. Also to be demonstrated with reference to the ensuing figures is the operation of the arithmetic unit 78 which, in response to signals of the address generator 46 and in accordance with the invention, functions in an iterative fashion in which the iterated arithmetic operations are repeated periodically with each output sample interval; this is in contradistinction to the operation of the memory 80 which, in the example of FIG. 2, operates to provide the set of partial sums with each summation being repeated with a periodicity of one iteration for each three output sample intervals.

Figure 3:
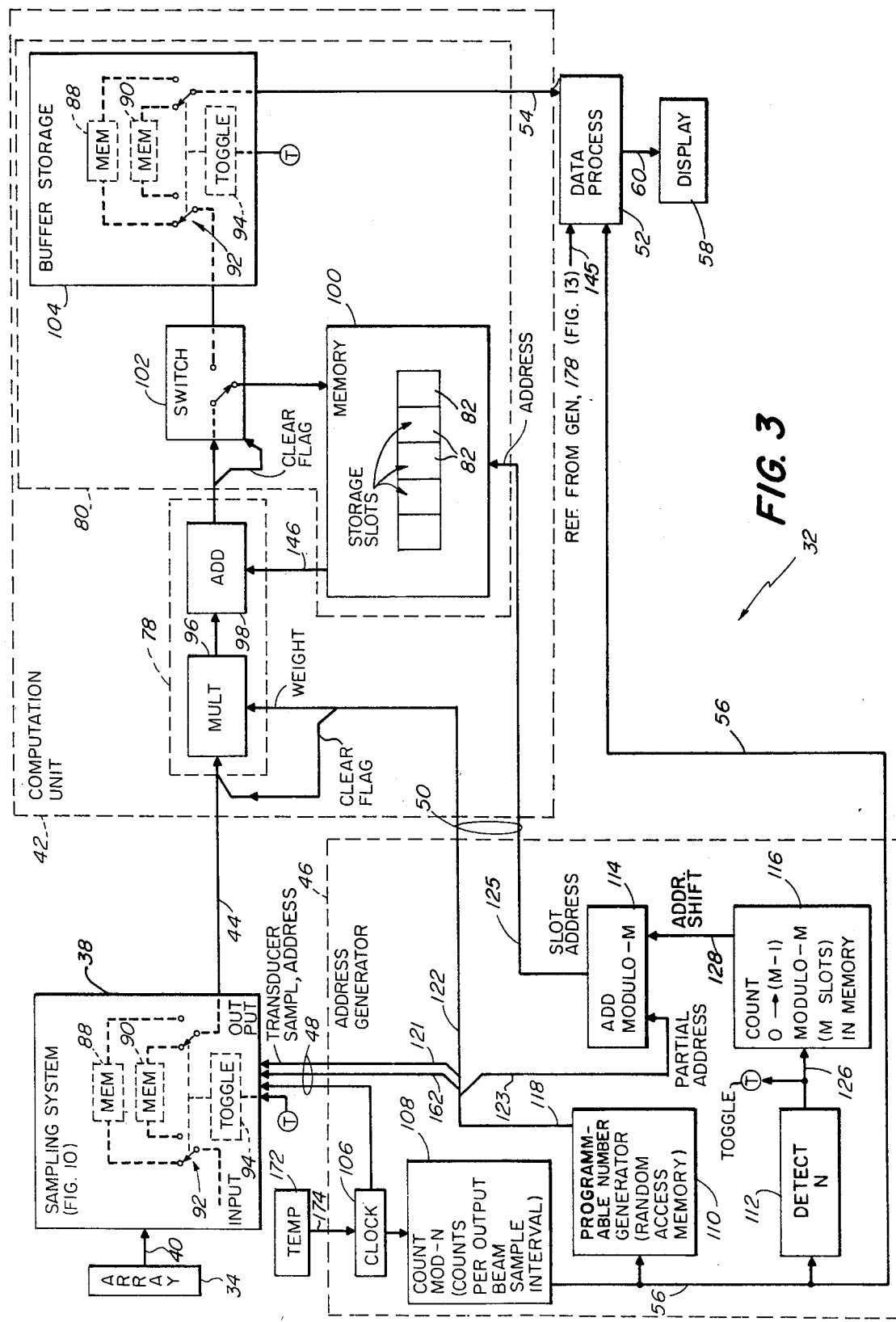
FIG. 3 is a block diagram of a sonar system of FIG. 1 and discloses elements of the computation unit and an address generator, the latter having means for permuting the addresses applied to the memory of the computation unit.
Figure 10:
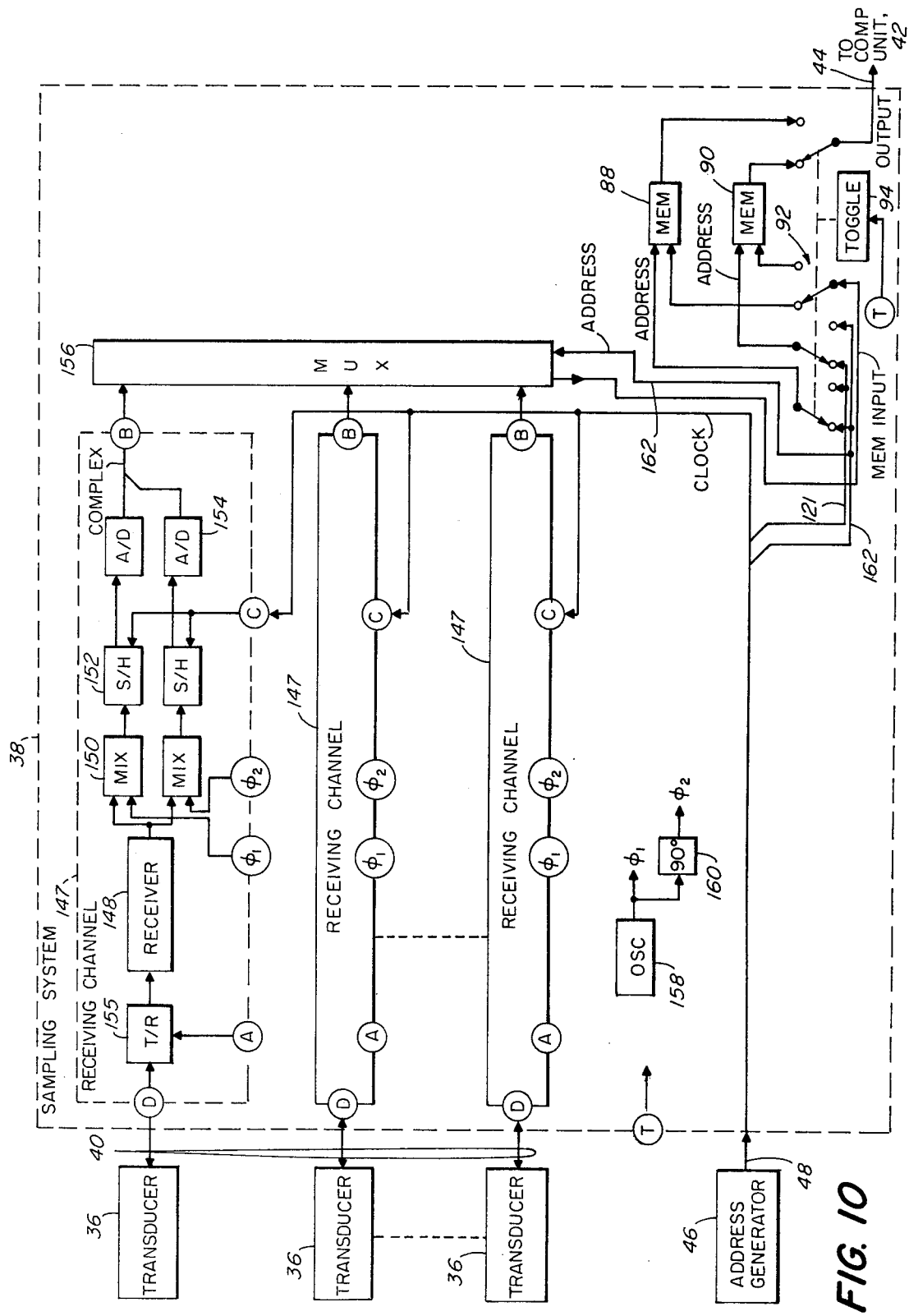
FIG. 10 is a block diagram of the sampling system of FIGS. 1–3.

Referring now to FIG. 3 there are seen the array 34, the sampling system 38, the address generator 46, the computation unit 42, the data processor 52 and the display 58 previously seen in FIGS. 1 and 2. The sampling system 38 to be described in detail subsequently with references to FIG. 10, is seen to comprise two memories 88 and 90 which are interconnected by a selector switch 92 driven by a toggle circuit 94 for alternately coupling the memories 88 and 90 to an input circuit while coupling, respectively, the memories 90 and 88 alternately to line 44.

The computation unit 42 comprises the arithmetic unit 78 and the memory 80 of FIG. 2, the arithmetic unit 78 comprising a multiplier 96 and an adder 98, while the memory 80 comprises a memory 100, a switch 102, and buffer storage 104. The buffer storage 104 comprises a memory 88, a memory 90, and a switch 92 driven by a toggle circuit 94, the operation of these components having been previously disclosed for the sampling system 38.

The address generator 46 comprises a clock 106, a counter 108, a generator 110, a detector 112, an adder 114, and a counter 116. The clock 106 provides timing signals, via a line which is seen to fan into the line 48, for operating the sampling system 38. The clock 106 also provides clock pulses to the counter 108 which counts these pulses modulo-N, the output count of the counter 108 appearing on line 56 whereby it is coupled to the data processor 52 as well as to the generator 110 and the detector 112. The number N represents the number of mathematical operations to be accomplished by the computation unit 42 during a single one of the output sample intervals described previously with reference to FIG. 2. The generator 110 may comprise random access memory, and, in response to each individual count of the counter 108, provides a number on line 118 which has sufficient digits therein to accomplish the following: (1) to address an input sample of transducer signal in the memories 88 and 90 of the sampling system 38, (2) to provide a multiplying factor to the multiplier 96 for weighting the individual transducer signal samples prior to their summation for shaping the radiation pattern of a beam of radiation, and (3) to address a slot 82 within the memory 100. The line 118 is seen to fan out into lines 121, 122 and 123 for coupling the digits of the numbers provided by the generator 110 respectively to the sampling system 38, the multiplier 96, and the adder 114. The output of the adder 114 on line 125 provides the slot address for the memory 100.

The detector 112 detects the digits of the number N and, in response thereto, provides a pulse on line 126. The pulse on line 126 occurs once during each output sample interval since the counter 108 counts modulo-N. The pulse on line 126 is coupled to terminal T of the sampling system 38 and to terminal T of the buffer storage 104 for operating the toggle circuits 94 therein to drive the switches 92 to the alternate positions. The pulse on line 126 is also applied to the counter 116 which counts these pulses modulo-M, where M is the number of slots 82 in the memory 100. The output of the counter 116 on line 128 attains values sequentially from zero to (M-1), the number on line 128 being utilized in shifting the slot address of the memory 100 as will be explained hereinafter. The number on line 128 and the number on line 123 are summed together modulo-M by the adder 114 to provide the complete slot address of the slots in the memory 100 on line 125, the digital number provided by the adder 114 having values from one to M.

Figure 4:
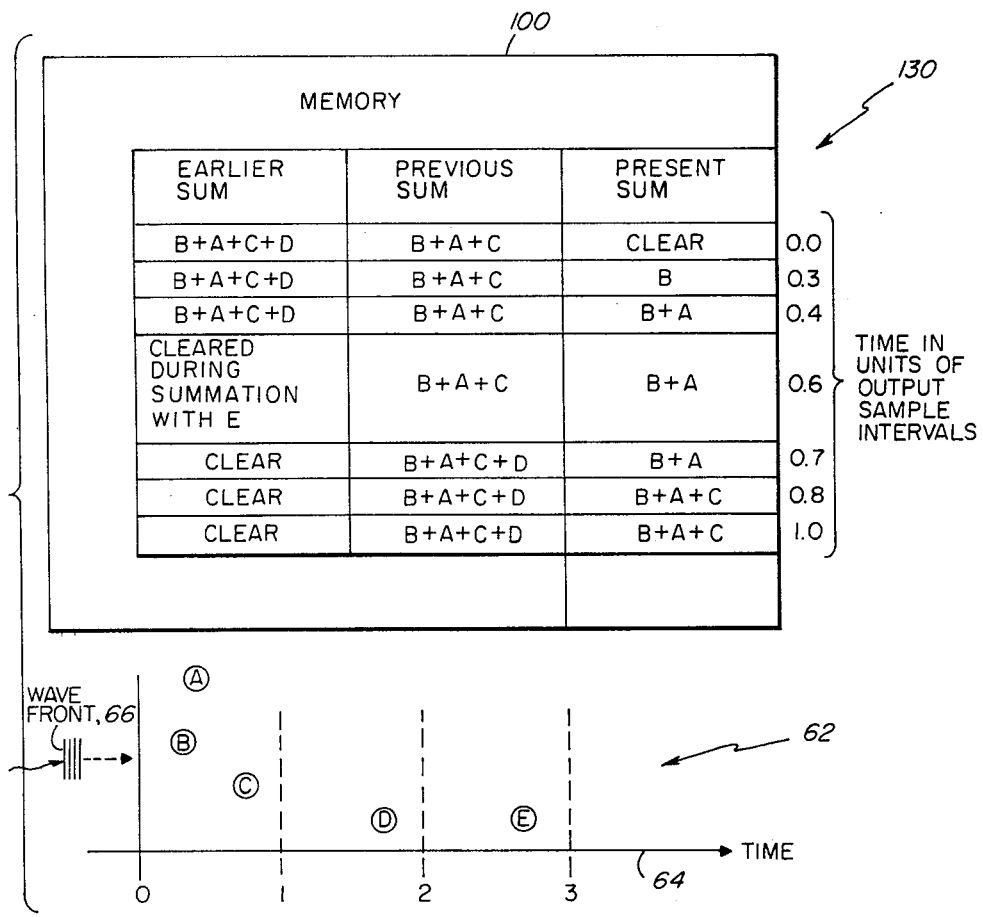
FIG. 4 is a timing diagram showing the contents of partial summations of input samples stored in the memory of FIG. 3 for extracting output samples from a beam of radiation incident upon the array of FIG. 1, the figure including a graph showing the direction of incidence of a wavefront upon a portion of the transducers of the array.

With reference to FIG. 4, there is seen a timing diagram 130 of the memory 100 which portrays the partial sums stored in each of three slots 82, the slots represented by the vertically columns. In addition to the timing diagram 130, there is also presented the graph 62, of FIG. 2, showing the wavefront 66 propagating across the transducers A-E in a direction parallel to the time axis 64, this being the direction of the receiving beam for which the data in the memory 100 is depicted by the timing diagram 130. The wavefront 66 is incident upon transducer B first. A sample of the signal provided by the transducer B in response to the incident wavefront 66 is stored in the slot utilized for the present partial sum at a time shortly after t=0, this being seen in the timing diagram 130 as occurring at t=0.3. The slot utilized for storing the present partial sum will sometimes be referred to hereinafter as the present slot corresponding nomenclature, namely, previous slot and earlier slot, identifying the storage of previous and earlier partial sums. In the diagram 130 the letter B is entered in the second row of the present slot, this row being identified by the numeral 0.3 of the time axis which represents the time of occurrence in terms of one output sample interval. It is noted that at time t=0 the present slot is clear, there being no data stored therein at the time t=0.

Referring to both the diagram 130 and the graph 62, it is seen that the wavefront 66 is incident upon the transducer A at the time t=0.4 at which time the arithmetic unit 78 extracts the sample B from the memory 100 and sums it with the sample A, the letters A-F of FIG. 1 also serving to identify the weighted samples of the respectively lettered transducers 36, and places the sum B+A in the present slot, the contents of the present slot at time t=0.4 being shown in the graph 130 as B+A. At time t=0.8 the wavefront 66 is incident upon transducer C at which point the arithmetic section 78 extracts the term B+A from the present slot and sums it with sample C and places the sum B+A+C in the present slot as shown in the diagram 130 in the next to the last row thereof. Thus, at the conclusion of one output sample interval, the present slot which was initially clear now contains the partial sum of the output sample, namely, B+A+C.

As has been noted hereinabove with respect to the situation portrayed in graph 62 there are three output samples being generated simultaneously corresponding to the three output sample intervals along the time axis 64. The most recent output sample being generated is the one described above with reference to the present slot of the diagram 130. The immediately preceding output sample is being generated by the previous slot of the diagram 130. With reference to the previous slot, it is seen that at time t=0 the slot contains B+A+C, which shows that the signals of the transducers B, A and C have already been combined to provide a partial sum of this output sample. As seen in the graph 62, the wavefront 66 is incident upon transducer D at a time t=1.6 with reference to the time axis 64, or t=0.6 with reference to the beginning of the second output sample interval.

In the timing diagram 130, the time is shown with reference to a single interval of the time axis 64, this interval being the first, second and third intervals respectively for the present, previous and earlier slots. Alternatively, this relationship may be described as a shifting of the time axis 64 by one interval for each of the slots in the timing diagram 130. In this way the diagram 130 can portray the simultaneous operation of each slot during a single output sample interval. Thus, the diagram 130 shows that subsequent to the combination of the transducer samples B+A and prior to the summation of the transducer samples B+A+C, there occurs at t=0.7 a summation of the sample D with the partial sum B+A+C, the partial sum having been extracted from the previous slot 82 of the memory 100 and combined with the sample D by the arithmetic unit 78 whereupon the partial sum B+A+C+D is inserted in the same slot which held the partial sum B+A+C. It is also seen by examination of the diagram 130 and the graph 62 that prior to the formation of the partial sum B+A+C+D in the previous slot but subsequent to the formation of the partial sum B+A in the present slot, an operation is accomplished in an earlier slot at time t=0.6 wherein the partial sum B+A+C+D is extracted from its bin in the earlier slot and combined with sample E to produce a complete output sample which is then coupled via the switch 102 of FIG. 3 to the buffer storage 104 leaving the earlier slot clear.

Figure 5:
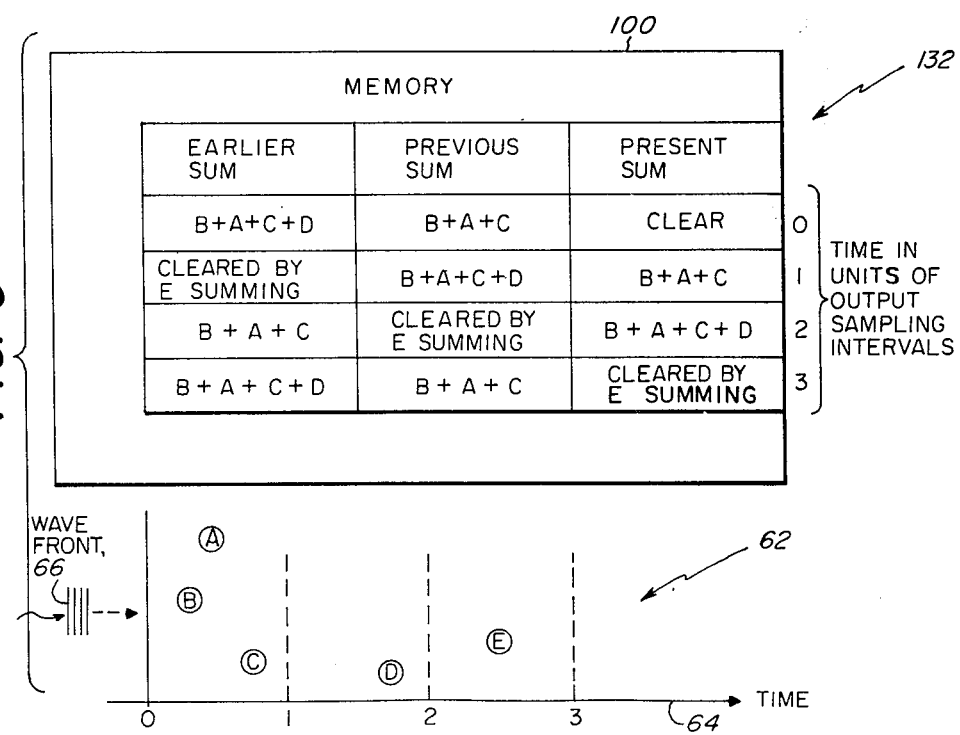
FIG. 5 is a further timing diagram of the partial summations of FIG. 4 showing the contents of the memory during succeeding intervals of the output samples.

Referring now to FIG. 5, there is seen a timing diaphram 132 along with the graph 62. The timing diagram 132 is an extension of the diagram 130 of FIG. 4 and shows the constituents of the three partial sums at the beginnings of four consecutive output sample intervals along the time axis 64. While not apparent from the diagram 132, the actual slots 82 of FIG. 3 utilized for the storage of the partial sums are permuted, as was described hereinabove, at each output sample interval; this permutation will be seen with reference to FIG. 7. At time t=0, this being the top row of the diagram 132, the diagram 132 shows the same data in storage as does the top row of the diagram 130. Similarly, the second row of the diagram 132, corresponding to a time t=1, shows the same stored data as does the bottom row of the diagram 130. The third row of the diagram 132 shows that a sample of the D transducer signal has been added to the present partial sum, while the last row at time t=3 shows that the present partial sum B+A+C+D has been combined with an E sample to form a completed output sample leaving the slot clear. With respect to the previous partial sum, it is noted that at time t=2 the slot has been cleared upon the summation of an E sample with the partial sum B+A+C+D. Since the previous slot has become clear by time t=2, it is then available to again be utilized for generating a subsequent output sample and, as shown in the bottom row of diagram 132, at t=3 that a slot is already storing a partial sum contains the beginnings of an output sample, this being indicated by the partial sum B+A+C. Similarly, the slot containing the earlier partial sum having been cleared by time t=1, the slot is again being utilized in the generation of a later output sample, this being shown by the partial sum B+A+C at time t=2 in the timing diagram. In the bottom row, the earlier slot is seen to have been updated and now contains the partial sum B+A+C+D of the later to-be-formed output sample.

As can be seen from FIGS. 4 and 5, during every output sample interval a sample of each transducer signal is added to some partial sum, be it in the present slot, the previous slot, or the earlier slot. For example, the B sample at time t=0.3 is placed in some slot 82 of the memory 100, be it the present slot, the previous slot, or the earlier slot. During every output sample interval at time t=0.4, the partial sum B+A is placed in some slot, be it the present slot, the previous slot, or the earlier slot, of the memory 100. A similar comment applies to each of the other operations shown in the diagram 130. In this way, a feature of the invention becomes apparent, namely, that the operations of the arithmetic unit 78 are shared among a plurality of the slots 82 of the memory 100 for any beam and, furthermore, that the operation of the arithmetic unit 78 is iterative, the iteration being accomplished once during each output sample interval.

Figure 6:
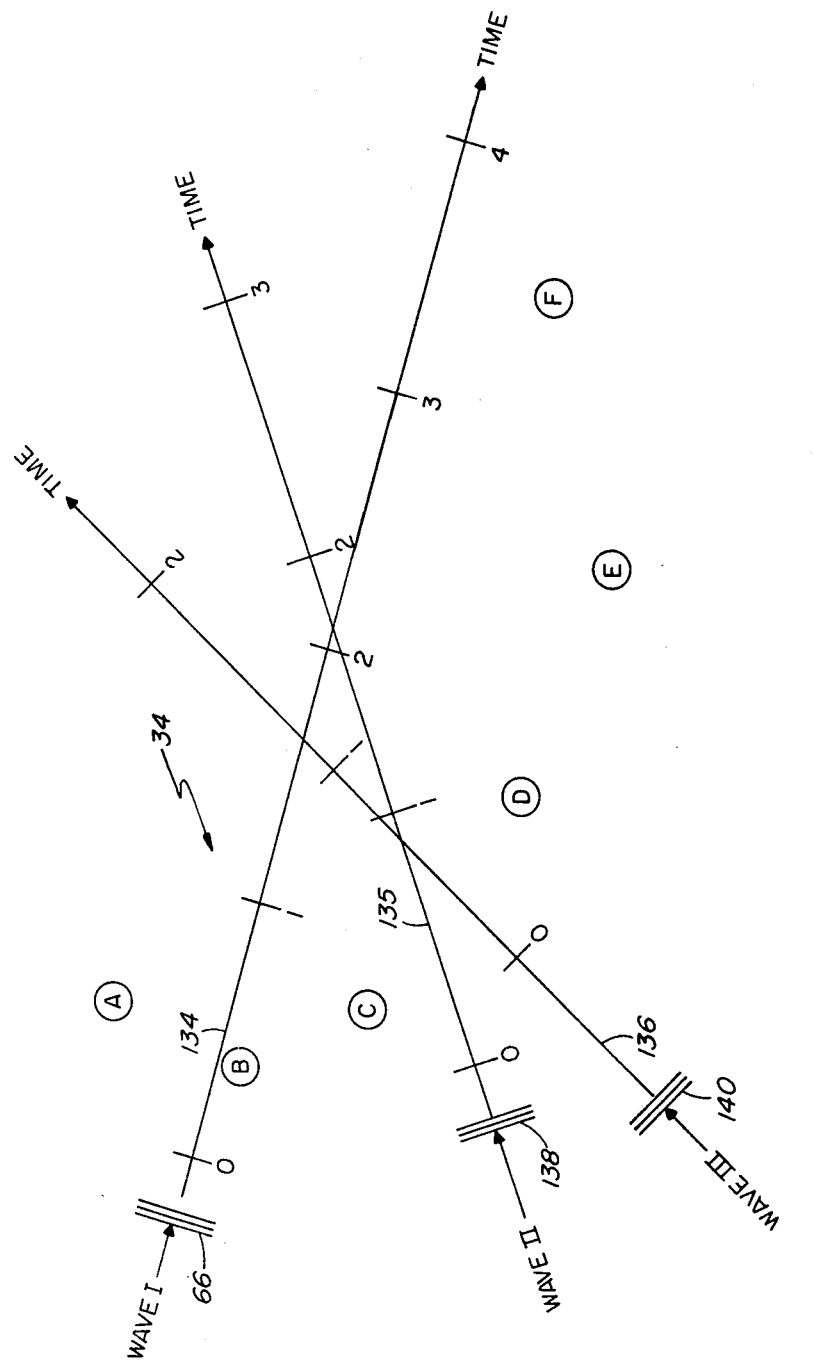
FIG. 6 portrays a portion of the transducer array of FIG. 1 and also shows three graphs superposed thereupon which show respectively the times of incidence of three separate wavefronts upon the several transducers for each of three separate directions of propagation.

Referring now to FIG. 6, there are seen three graphs 134, 135, and 136 superposed upon the transducers A-F of the array 34 of FIG. 1. Three waves propagate along the time axes of the respective graphs 134-136, the first wave having the wavefront 66 previously seen in FIG. 2 and propagating along the time axis of the graph 134, the second wave having the wavefront 138 propagating along the time axis of the graph 135, and the third wave having the wavefront 140 propagating along the time axis of the graph 136. The direction of propagation of the wavefront 66 relative to the array 34 coincides with that previously disclosed in FIG. 2 and propagates from transducer B to transducer F in a period of time extending through four output sample intervals. The wavefront 138 propagates from transducer B past transducer F in a period of time extending through three output sample intervals. The wavefront 140 propagates from transducer C past transducer F during a period of time extending through two output sample intervals. A description of the memory 100 analogous to that presented above in reference to FIGS. 4 and 5 will now be presented for the three waves of FIG. 6 by means of the timing diagrams of FIGS. 7 and 8.

Referring now to FIG. 7 there is seen a timing diagram of the data stored in the slots 82 of the memory 100 of FIG. 3. In the preferred embodiment of the invention, the memory 100 has many more slots than the total number of output sample intervals required for a complete passage of a wavefront along the longest diagonal of the array 34 of FIG. 1. FIG. 7 shows ten such slots which are represented by vertical columns.

Beginning with slot #4, by way of example, the partial B+A+C is seen to be found during the first output sample interval. This corresponds in FIG. 5 to the second row of the present partial sum. During the second output sample interval, there appears in the fourth slot the partial B+A+C+D, this corresponding in FIG. 5 to the third row of the present slot. This is in accordance with the presentation above with reference to FIG. 2 wherein it is seen that the arithmetic unit 78 is extracting a partial sum from a slot of the memory 80 and combining therewith the next signal sample from the transducer intercepted by the wavefront, whereupon the new partial sum is placed in that slot. The Roman numerals in both FIGS. 7 and 8 identify the first, second or third beams to which the summations apply, these beams corresponding respectively to the first, second or third wavefronts of FIG. 6.

Continuing with the fourth slot of FIG. 7, during the third output sample interval, the input sample from transducer E is combined with the previous partial sum B+A+C+D. During the fourth output sample interval, the partial sum B+A+C+D+E is extracted from the memory 100 and combined with the input sample of the signal from transducer F to produce a complete output sample for the first wave of FIG. 6. This completed output data sample is then coupled by the switch 102 of FIG. 3 to the buffer storage 104 thereby clearing the fourth slot 82 of the memory 100, this clearing occurring during the fourth output sample interval as shown in FIG. 7.

Referring to slot #5 of FIG. 7, the data stored therein during the second output sample interval is seen to be identical to the data stored in slot #4 during the first output data sample interval. Also, the data stored in slot #5 during the third interval is the same as that stored in slot #4 during the second interval, this relationship continuing with subsequent intervals. The data stored in slot #6 is seen to lag the corresponding data stored in slot #4 by two output sample intervals. Similarly, the data stored in the seventh slot is seen to lag to data stored in the fourth slot by three output sample intervals, this relationship continuing during subsequent intervals with the data of the first slot lagging the data of the tenth slot by one output sample interval.

A comparison of three contiguous slots of FIG. 7 is readily made with the three contiguous partial sums of the diagram 132 of FIG. 5. For example, consider the slots #5, #6, and #7 of FIG. 7 respectively with the earlier partial sum, the previous partial sum, and the present partial sum of FIG. 5. During the fourth output sample interval, the fifth slot of FIG. 7 has stored the data B+A+C+D+E. The earlier partial sum in the second row of FIG. 5 also shows that the E transducer signal sample has been summed with the partial sum B+A+C+D. Again, during the fourth interval, FIG. 7 shows the data B+A+C+D in the sixth slot, this being identical to the data shown in the second row of the previous partial sum in FIG. 5. Also, during the fourth output sample interval, the seventh slot of FIG. 7 shows the data B+A+C which is identical to that shown in FIG. 5 in the present partial sum at the second row thereof. The temporal relationship existing between the contiguous partial sums of FIG. 5 is thus seen to be identical to the temporal relationship of the partial sums stored in the contiguous slots of FIG. 7, except for the fact that in FIG. 7 there is presented the formation of a beam utilizing the transducers A-F while in FIG. 5 the situation has been simplified to show a formation of the beam by only the tranducers A-E. In FIG. 7, the timing diagram is captioned with the words earlier and later, the earlier occurring events being toward the left with the later occurring events being toward the right, this corresponding to the positions of the three columns of FIG. 5 in which the earlier partial sum is to the left while the present partial sum is to the right.

Referring now to FIG. 8, there is seen the data of the timing diagram of FIG. 7 with further data relating to the partial summations for the second and third waves of FIG. 6. With reference to the seventh slot, the wavefront 138 of FIG. 6 is seen to impinge upon transducer B followed by transducers C, A, and D in that order during the first output sample interval. The summation of the samples of signals from these transducers is thus seen in the first row of slot #7 as B+C+A+D. During the second and third output sample intervals, the wavefront 138 is seen to impinge upon the E transducer and the F transducer respectively. Accordingly, the timing diagram of FIG. 8 shows in the second and third output sample intervals of slot #7 the addition of the sample of the E transducer signal to the partial sum followed by the addition of the sample from the F transducer with a clearing of the seventh slot. Similarly, the wavefront 140 of FIG. 6 is seen to impinge upon the transducers C, D, B and E in that order during the first output sample interval of slot #9 followed by transducers A and F in the second output sample interval. In the second output sample interval, the partial sum C+D+B+E+A is stored in the ninth slot, this partial sum being taken from the ninth slot during the summation with the F sample whereupon the ninth slot is cleared.

With respect to the seventh slot of FIG. 8, it is noticed that the data stored therein relating to the partial summations for the second wave of FIG. 6 involves signal samples from the same set of transducers as that seen in the sixth slot, except that the corresponding stored data of the seventh slot occurs during the next output sample interval. Similarly, with respect to the corresponding data of the eight slot and subsequent slots the stored data appears in successively later output sample intervals. In the same manner, the stored data for the partial summations of the third wave of FIG. 6 appearing in the ninth, tenth, first and subsequent slots is seen to appear during output sample intervals subsequent to the occurrence of the data in slot #8. The arrows 133 show that corresponding data appears in successive ones of the slots during successive ones of the output sample intervals. During the first output sample interval, the tenth slot is empty to provide, by way of example, an extra storage space in the event that it be desired to shift the direction of the second or third beams to a direction that would require an extra slot of storage. The extra storage region of the memory 100 is also seen to propagate through the diagram of FIG. 8 in the direction of the arrows 133 and, accordingly, appears in the first slot during the second output sample interval. Typically, a memory such as the memory 100 would comprise many more slots 82 than those described in FIG. 8 to accommodate simultaneously many beams in many directions.

Referring now to FIGS. 9 and 3, a second feature of the invention, the aforementioned iterative operation of the arithmetic unit 78 is explained. FIG. 9 is a timing diagram directed to the partial slot address on line 123. FIG. 9 differs from FIGS. 7 and 8 in that FIG. 9 deals with the slots designated by the partial slot address on line 123 while FIGS. 7 and 8 deal with the complete slot address on line 125. The slot address on line 125 differs from the partial slot address on line 123 by virtue of the slot address shift on line 128 which is summed thereto by the adder 114. FIG. 9 is directed to the distinction between the partial slot address on line 123 and the slot address on line 125 which was described with reference to FIGS. 7 and 8.

By way of example, the number 3 is presumed to appear on line 128. Thus, the slot address on line 125 differs from the partial slot and address on line 123 in modulo M addition by the number 3. Accordingly, the data of the first four columns shown in FIG. 9 corresponds to the data during the fourth output sample interval of the slots 4, 5, 6, and 7 of FIGS. 7 and 8. The correspondence between FIGS. 8 and 9 can be seen by comparing the fourth output sample interval and the fourth slot of FIG. 8, and with the partial slot address of the first column of FIG. 9 and any of the output sample intervals, each of these intervals providing identical instructions as to the partial summations. It is shown that the weighted signal sample of the F tranducer has been combined with the previous value of the partial sum $B+A+C+D+E$, which value was previously stored in the fourth slot of FIG. 8. Similarly, the fifth slot of FIG. 8 shows the summation of sample E with the previously stored partial sum $B+A+C+D$, this corresponding with the instruction of the partial slot address of the second column of FIG. 9.

With respect to the operation of the generator 110, the multiplier 96 and the adder 98 of FIG. 3, the instructions given by the generator 110 to the multiplier 96 and to the adder 98, as noted in FIG. 9, may be demonstrated with reference to the foregoing summation of the F sample. The instructions are to obtain the weighted value of the F transducer signal sample, and to sum this weighted sample to the previous value stored in the aforementioned slot 82. In response to the address signal of line 125 of FIG. 3, the contents of that slot 82 are fed from the memory 100 along the line 146 to the adder 98. Thus, by virtue of the digital numbers transmitted along lines 121, 122 and 123, the generator 110 obtains the input sample of the signal from the F transducer which was produced at the moment that the wavefront 66 of FIG. 6 was incident thereupon, directs the multiplier 96 to multiply this signal sample by the weighting factor on line 122 to produce the weighted signal sample represented by the symbol F, extracts the previous value of the partial sum stored within the aforementioned bin along the line 146, and directs the adder 98 to combine the partial sum on line 146 with the F signal sample to produce a completed output sample for the first wave of FIG. 6. The generator 110 also transmits a one-bit signal along line 122 which serves as a clear flag, the clear flag passing through the arithmetic unit 78 without participating in the arithmetic operations therein, to operate the switch 102. In response to the clear flag, the switch 102 couples the completed output sample to the buffer storage 104 so that the aforementioned slot 82 of the memory 100 is clear. Upon termination of the clear flag signal, the switch 102 reverts to the position shown in FIG. 3 so that subsequent partial summations produced by the arithmetic unit 78 return to their respective slots 82 in the memory 100.

With respect to addressing the memories 88 and 90 of the buffer storage 104, the number on line 118, provided by the generator 110, may contain additional digits to which the buffer storage 104 is responsive for addressing the memories 88 and 90 therein. Alternatively, the data entered into the buffer storage 104 is stored in serially arranged locations, the order thereof being made available to the data processor 52 via the count on line 56. Thereby the data processor 52 associates each stored number with a specific sample of a specific beam to permit filtering and correlation of signals received in the individual beams. A reference for correlation is provided by a waveform generator of FIG. 12 along line 145.

It should be noted that in performing the aforementioned combination of the F signal sample with the previously stored partial summation, the only instructions required of the generator 110 are the selection of the specific input sample by line 121, the weighting factor and clear flag on line 122, and the partial slot address on line 123. These signals on the three lines 121-123 are invariant with the particular output sample interval. This is shown in FIG. 9 wherein during the fifth output sample interval, the instruction provided in the first column of the partial slot address, namely, "add F" is the same as that previously described for the corresponding position in FIG. 8 in the fourth output sample interval. In the absence of the permutations provided by the adder 114, the timing diagram of FIG. 9, by itself, suggests that the F sample is simply summed together with whatever data happens to have been stored during the fourth output sample interval within the aforementioned slot 82. As has been noted hereinabove, the aforementioned slot had been cleared after the F summation of the fourth output sample interval so that, as seen in FIG. 9 without considering the operation of the adder 114, the signal sample F appears to be combined with the partial sum of zero to give an output sample consisting of only the F input signal sample. However, this is not the case since the adder 114 sums the slot address shift of line 128 to the partial slot address on line 123. In the discussion hereinabove with reference to the fourth output sample interval of FIG. 9, it was presumed that the number 3 was present on line 128. As was explained hereinabove with reference to FIG. 3, the number appearing on line 128 is advanced by a count of one for each succeeding output sample interval so that, during the present discussion of the fifth output sample interval of FIG. 9, the number 4 appears on line 128 with the result that the data of the fifth slot of FIG. 8, namely, the partial sum $B+A+C+D+E$ rather than the value of zero in slot #4, is combined with the F signal sample.

With respect to the foregoing example of the summation of the E sample to the data stored in the fifth slot of FIG. 8 during the fourth output sample interval, the partial sum B+A+C+D is summed with E. The instruction for this summation appears in column 2 of FIG. 9. The resulting partial sum is later extracted from the fifth slot during the fifth output sample interval to be combined with the F signal sample. Thus, it is seen that even though the instructions provided by the generator 110 on the four lines 121-123, are identical during the fourth and the fifth output sample intervals, the actual arithmetic operations accomplished by the adder 98 are different. The switching over of the addition of the F sample from the fourth slot to the fifth slot of the memory 100 between the fourth and fifth output sample intervals was accomplished by the adder 114, this switching over being independent of the operation of the generator 110. In this way, it is seen that the iterative procedure of the generator 110 and the arithmetic unit 78 can be completed once during each output sample interval while the operation of the various slots 82 of the memory 100 is periodic over many output sample intervals.

With reference to the fourth column of the partial slot addresses of FIG. 9, the term B+A+C indicates that three arithmetic operations have been ordered by the generator 110 during one output sample interval. The times of occurrence of these three operations were seen previously in the timing diagram of FIG. 4 with reference to the present slot. Thus, with reference to FIGS. 3, 4 and 9, at t=0.3, the generator 110 transmits signals along the lines 121-123 which place sample B in the memory 100, at t=0.4, the generator 110 provides signals on the lines 121-123 which provide for the extraction of the B sample from its location in the memory 100 and the combination thereof with the A sample obtained from the sampling system 38 to provide the sum B+A in the location of the memory 100 previously utilized in storing the B sample. Similar comments apply to the generator 110 at the time t=0.8 when the partial sum B+A is extracted from its location in memory 100 and replaced with the partial sum B+A+C. Similar comments apply to the summation of the D sample of FIGS. 4 and 9 to a previously obtained partial sum.

The times of occurrence of the foregoing input samples can also be seen from the graph 134 of FIG. 6. Thus, the time of occurrence of the operation involving the F sample occurs at the time t=0.5 in each output sample interval. Accordingly, it is seen that for production of the output samples for a beam directed along the time axis of the graph 134 involves mathematical operations which are ordered by the generator 110 at the times t=0.3, 0.4, 0.5, 0.6, 0.7, and 0.8 in each output sample interval. In view of the foregoing examples, it is seen that the generators 110 and the arithmetic unit 78 perform a complete iteration of operation during a single output sample interval while the slot shifting of the memory 100 proceeds over many output sample intervals.

It is readily apparent that the times of the foregoing operations for a plurality of beams may, in some instances, occur almost simultaneously. This situation is readily accommodated since the times of impingement of the respective wavefronts on the individual transducers A-F refers more specifically to the times when samples of the transducer signals are obtained by the sampling system 38. Once the samples have been stored in the memories 88 and 90, the operations ordered by the generator 110 are timed to occur sequentially, there being no error resulting from the sequential operation since the proper value of the transducer signal sample has already been stored in the sampling system 38. It is noted in passing that, in a further embodiment of the sampling system 38 to be disclosed in FIG. 11, wherein there is no memory such as the memories 88 and 90 of the sampling system 38, the sampling of the transducer signals is done at the times when ordered by the generator 110 so that in this case, a small error results from the sequencing of operation which should coincide in time. However, as will be seen with reference to that alternative embodiment of the sampling system, the error is sufficiently small so that it may be neglected. The small magnitude of the error results from the sampling rate being sufficiently fast relative to the speed of propagation of the radiant energy past the transducers that there is little difference in the sampled signal resulting from a delay in sampling.

Referring now to FIG. 10, there is seen a block diagram of the sampling system 38 and its interconnections with the transducers 36 and the address generator 46, these interconnections being seen previously with reference to FIGS. 2 and 3. The sampling system 38 comprises a plurality of channels 147 each of which is coupled to an individual one of the transducers 36, each channel 147 including a receiver 148, mixers 150, sample and hold units hereinafter referred to as S/H 152, analog-to-digital converters hereinafter referred to as A/D 154, and a transmit-receive circuit hereinafter referred to as T/R 155. The sampling system 38 also comprises a multiplexing unit hereinafter referred to as MUX 156, an oscillator 158, a 90° phase shifter 160, and the memories 88 and 90, the switch 92, and the toggle circuit 94 previously disclosed in FIG. 3. One of the mixers 150 in each channel 147 has a reference input terminal coupled to the $\phi_1$ terminal of the oscillator 158 while the second mixer 150 has its reference input terminal coupled to the $\phi_2$ terminal of the phase shifter 160. In each channel 147, the output of the receiver 148 is coupled to each of the mixers 150, and the output of each mixer 150 is coupled via an S/H 152 to a A/D 154.

Each receiver 148 includes a preamplifier and bandpass filter (not shown) for amplifying the signals of the individual transducers 36, the bandwidths of the filters being sufficiently wide to pass the signals of the transducers 36 while attenuating noise in a spectrum outside of the transducer signal. By way of example, the aforementioned coupling of the mixers 150 to the $\phi_1$ and $\phi_2$ terminals provides in-phase and quadrature sampling of the transducer signals, it being understood that the system 32 of FIG. 103 can also be utilized with envelope detection and sampling of the envelope (not shown). The oscillator 158 provides a sinusoid having a frequency lying outside the passband of the receiver 148 to produce a suitable intermediate frequency for operation of the mixers 150. The mixers 150 are understood to include an output filter for extracting one sideband of the mixing operation, the mixers 150 coupled to the $\phi_1$ terminal providing the in-phase intermediate frequency signal to the S/H's 152 while the mixers coupled to the $\phi_2$ terminal provide the quadrature intermediate frequency signal to their respective S/H's 152. In response to clock signals from the clock 106 of FIG. 3 coupled to the sampling system 38 via line 48, each S/H 152 provides a sample of the signal incident thereupon from its corresponding mixer 150. The samples held by each S/H 152 are analog samples, the samples being converted to digital numbers by the A/D's 154 coupled to the respective ones of the S/H's 152. The pairs of A/D's 154 coupled to each of the receivers 148 provide pairs of digital numbers which represent a complex number, each complex number being coupled via terminal B of the respective channels 147 to the MUX 156 and represent the value of the sample of a signal provided by the corresponding transducer 36.

The generator 110 of FIG. 3 provides a digital number along line 162, seen fanning out of line 118 in FIG. 3, to the MUX 156 and each of the memories 88 and 90. In response to the digital number on line 162, the MUX 156 operates as a selector switch to selectively couple individual ones of the complex samples from the A/D's 154 via switch 92 to one of the memories 88 and 90. As noted hereinbefore with reference to the description of FIG. 3, the toggle signal at terminal T operates the switch 92 to alternate between the memories 88 and 90 during alternate ones of the output sample intervals. As is shown in FIG. 10, signal samples are being coupled from the MUX 156 to the memory 88 while signal samples to the computation unit 42 are being coupled from the memory 90. During the next output sample interval, the signal samples are coupled from the MUX 156 to the memory 90 while the signal samples coupled to the computation unit 42 are being coupled from the memory 88. In this way, the reading out of samples from the sampling system 38 to the computation unit 42 can be done at a rate and in a sequence which are independent of the reading in of the signal samples to the sampling system 38.

With respect to the clock signals operating each S/H 152, as noted hereinbefore, these clock signals occur at a sufficiently fast rate compared to the speed of propagation of a wavefront of radiant energy across the array 34 of FIG. 1 such that, irrespectively of the direction of an incident wavefront of radiant energy, at least six or seven samples per wavelength of the incident radiation are taken. This rate of sampling insures that any quantization phase errors resulting from the combination of the transducer signal samples are sufficiently small such that the output samples provided for beams in each of the directions in which the array 34 looks at incoming radiation result in a directivity pattern which is substantially free of grating lobes and grating nulls. In particular, it is noted that this sampling rate applied to each of the transducers 36 by the sampling system 38 results in many more samples of transducer signals being stored in the memories 88 and 90 than are required for the computations of the computation unit 42 in producing the beams of radiation.

The T/R 155 included within each receiving channel 147 permits a transmitting circuit, to be disclosed hereinafter with reference to FIG. 12, to be coupled between the transducers 36 and their corresponding receivers 148. The T/R 155 is coupled to the transducers 36 via terminal D of the receiving channel 164; terminal A is provided for coupling to the transmitting circuit.

The coupling of the address signals from the generator 110 via the lines 121 and 162 and via the switch 92 to the memories 88 and 90 provides an arrangement wherein the samples from the MUX 156 are coupled to the same memory, for example, the memory 88 as is the address from line 162. As noted above, the address on line 162 is utilized for storing data in the memories 88 and 90 while the address on line 121 is utilized for reading data out of the memories 88 and 90. As shown in the figure, while the address on line 162 is being coupled to the memory 88 by the switch 92, the address on line 121 is being coupled by the switch 92 to the memory 90, an output terminal of the memory 90 being coupled via the switch 92 to the output of the sampling system 38 on line 44. Toggling of the switch 92 by the toggle circuit 94 alters these interconnections so that the memory 88 is coupled to line 44, the memory 90 is coupled to the MUX 156, line 162 is coupled to the memory 90 and the line 121 is coupled to the memory 88.

Figure 11:
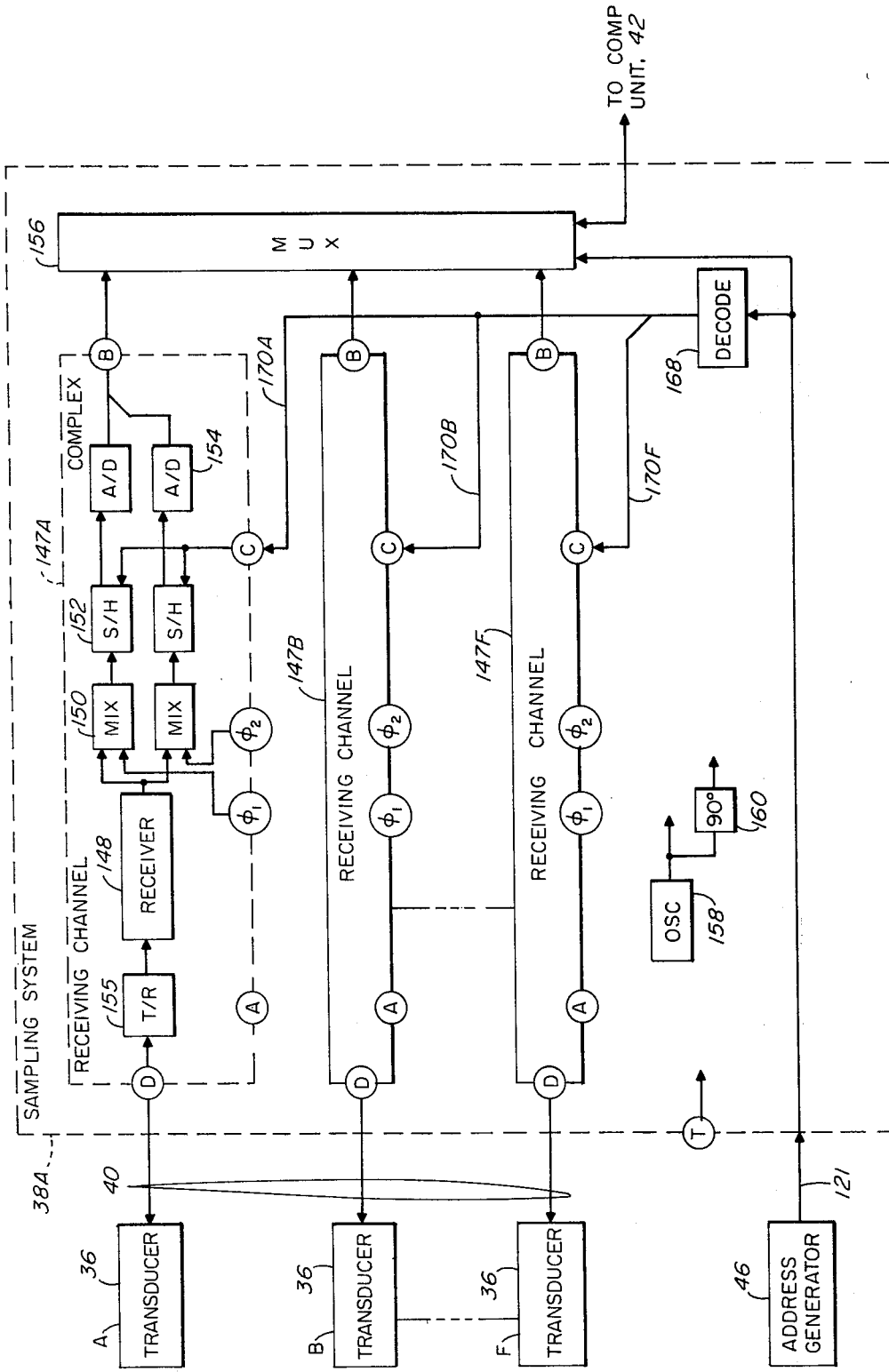
FIG. 11 is an alternative embodiment of the sampling system of FIG. 10.

Reffering now to FIG. 11, there is seen an alternative embodiment of the sampling system 38 of FIG. 10, this embodiment being identified by the legend 38A. The sampling system 38A retains the receiving channels 147 of FIG. 10, but the memories 88 and 90 and the switch 92 of FIG. 10 have been deleted in the sampling system 38A. Line 121 from the address generator 46 is coupled by a decoder 168 to each S/H 152. The decoder 168 in response to the digital signal on line 121 energizes an individual one of the lines 170 in accordance with the digital number appearing on line 121. The receiving channels 147 are further identified by the legends A-F and the lines 170 are further identified by the letters A-F when it is desired to identify a specific one of these channels or these lines. The line 121 is also coupled to the MUX 156 for selecting the signal of terminal B of a specific one of the receiving channels 147 in accordance with the digital signal on line 121. Thus, for example, if it is desired to utilize a sample of the signal produced by transducer 36A, the digital signal on line 121 operates the decoder 168 to energize line 170A which in turn operates both S/H's 152 in the channel 147. The complex signal sample from transducer A is coupled from terminal B of channel 147A via the MUX 156 directly through the line 44 whereby it is utilized by the computation unit 42. The S/H 152 holds the sample as long as the line 170A is energized, so that, several computations utilizing sample A may be performed by the computation unit 42 after which another line such as line 170B, is energized to provide a B sample on line 44. Thus, it is seen that when the system 32 of FIGS. 1-3 utilizes the sampling system 38A, each transducer signal sample is obtained as it is utilized in the computations, while with the sampling system 38, the system 32 obtains a complete set of transducer signal samples for all of the transducers 36 which is stored, individual transducer signal samples of the stored set being extracted as needed for the computations.

A further embodiment of the sampling system 38, and also of the sampling system 38A, can be obtained by replacing the MUX 156 with an analog form of multiplexer, not shown in the figures, the analog multiplexer being connected directly to the outputs of the mixers 150 in each of the channels 147, the output of the analog multiplexer being coupled serially via a sample and hold circuit and an analog-to-digital converter to the memories 88 and 90 in the case of the sampling system 38, or directly to the line 44 in the case of the sampling system 38A.

To provide improved accuracy in the forming of beams, a temperature sensor 172 is shown in both FIGS. 1 and 3 being coupled via line 174 to the clock 106 in the address generator 46. The speed of the clock 106 is responsive to a signal provided by the sensor 172 so that, as the speed of propagation of sonic energy in the water of the ocean increases or decreases in accordance with the ambient temperature of the ocean, the speed of the clock 106 is correspondingly increased or decreased. As noted hereinabove, the rate of sampling by the sampling system 38 has been set to provide for at least six or seven samples per wavelength of the radiation incident upon the array 34. Accordingly, when the speed of propagation increases or decreases, the rate of sampling is increased or decreased correspondingly to insure that the resulting directivity pattern for a beam of radiation incident upon the array 34 is invariant with the temperature of the ocean water.

In operation, therefore, sonic radiation incident upon the array 34 of FIGS. 1-3 produces signals in each of the transducers 36, the signal being dependent on the respective times of incidence of a wavefront of the radiation upon the respective transducers 36. The transducer signals are sampled by the sampling system 38, the samples being stored therein. In response to the clock 106 of the address generator 46, the counter 108 provides a succession of numbers which drives the generator 110. In response to these numbers, the generator 110 provides a sequence of digital numbers which selects samples stored in the sampling system 38, weights these selected samples by the multiplier 96, stores the weighted samples in designated locations in the memory 100, and combines stored samples with other weighted samples by the adder 98 to produce partial sums of output samples of the respective beams. The combining of successive samples of transducer signals continues, the successive partial sums for any one output sample being stored in a predesignated slot 82 of the memory 100 until the summation is completed whereupon the completed sum is transferred via the switch 102 to the buffer storage 104. The counter 108 counts modulo-N where N is the number of mathematical operations to be accomplished during each output sample interval. Thus, the counter 108 counts iteratively with a complete iteration being accomplished during each output sample interval of FIG. 8. Similarly, the generator 110 in response to the iterated sequence of numbers from the counter 108 provides an iterated sequence of arithmetic operations. The detector 112 signals the end of each output sample interval and the counter 116 counts the number of the output sample intervals, the counting being done modulo-M with the result that the count varies from zero to (M−1). The output of the counter 116 is added modulo-M to the partial slot address by the added 114 so that new data to be combined with the stored data in any one slot is advanced at a rate of one slot per output sample interval as is shown in FIG. 8. Since the adder operates modulo-M, the address for any one location in the memory 100 is seen to shift sequentially one slot at a time through all the slots, there being M slots in the memory 100, and then begins again with the first slot. This is in accordance with the showing of FIG. 8 in which, during successive output sample intervals, the addition of constituent sample values to the stored partial sums is accomplished by one entry of the sample values in successive ones of the slots. This arrangement permits any configuration of array of transducers, even an elongated array in which many output sample intervals may be required to produce a beam in one direction while only one or two output sample intervals may be required to produce a beam in a second direction.

It is also apparent that, in the situation wherein the generator 110 is providing beams in many directions, for example, 120 beams offset from each other by 320 to provide 360° of azimuthal coverage, the data processor 52 can select sequentially one beam at a time to provide the result of a scanning beam or, may select beams in any order to provide random access scanning. It is also apparent that the generator 110 may produce only a few beams if desired, for example, forward, aft, port and starboard. The invention as disclosed is, therefore, universally applicable to an array having any prescribed format. While the array 34 is shown in a single plane, it is understood that the combination of signal samples from the transducers of an array in the form of a hemisphere or other non-planar arrangement can be summed together to provide a beam in directions other than in the azimuthal plane.

Figure 12:
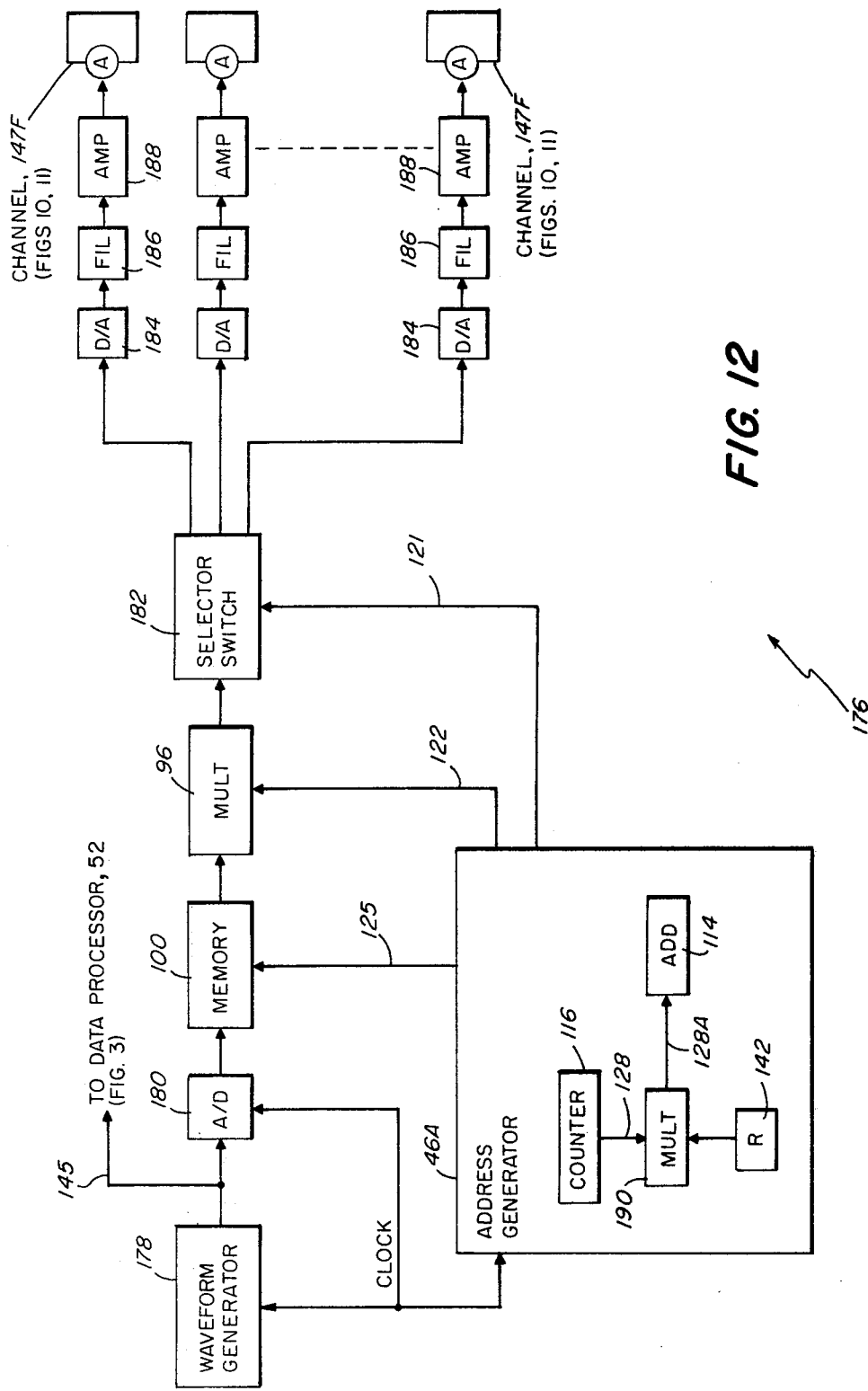
FIG. 12 is a block diagram of an embodiment of the invention for transmitting beams of sonic energy.

Referring now to FIG. 12, there is shown a block diagram of a transmitting system 176 which comprises a waveform generator 178, an analog-to-digital converter hereinafter referred to as A/D 180, a selector switch 182, digital-to-analog converters hereinafter referred to as D/A's 184, bandpass filters 186, and amplifiers 188, the diagram also showing the memory 100, the multiplier 96 and an alternative form of the address generator 46 previously described with reference to FIG. 3. The alternative form of the address generator 46 is identified by the legend 46A, has the same components as the generator 46 of FIG. 2 but, as shown, further comprises a multiplier 190 coupled between the counter 116 and the adder 114, and a source 192 of a digital number R. The number on line 128 is multiplied by R by the multiplier 190. The transmitting system 176 operates in a manner analogous to the receiving system 32 of FIGS. 1-3. The address generator 46 is seen coupled to the memory 100 via line 125, to the multiplier 96 via the line 122 and to the selector switch 182 via the line 121, the lines 125, 122 and 121 carrying the same type of signals as was disclosed with reference to the correspondingly numbered lines of FIG. 3. The clock signal from the clock 106 (seen in FIG. 3) of the address generator 46A is coupled to the waveform generator 178.

The waveform generator 178, is synchronized through the clock signal of the address generator 46, and provides a signal waveform suitable for transmission by the array 34 of FIG. 1, such a waveform being, for example, a pulsed sinusoid or a linearly-swept frequency-modulated sinusoid. The signal of the generator 178 is fed to the A/D 180 which, in response to the clock signal, samples the signal and converts each sample to a digital number which is presented to the memory 100. The generator 100 (seen in FIG. 3) of the address generator 46A provides a set of digital numbers along the line 125 which address the memory 100, the addresses of the slots 82 of the memory 100 being selected in a manner analogous to that shown with reference to FIG. 3, the digital samples from the A/D 180 being placed in the slots in accordance with the address as provided by line 125. Samples are extracted from the memory 100 in accordance with the addresses on line 125 and weighted by the multiplier 96 with weighting factors provided by line 122. The resulting weighted samples from the multiplier 96 are then applied by the selector switch 182 sequentially to each of the D/A's 184, the selection of specific ones of the D/A's 184 being governed by the digital signal on line 121 in a manner analogous to the designation of the locations in memory of the sampling system 38 of FIG. 3. Each D/A 184 converts the digital representation of a signal sample to an analog sample. The analog samples then pass through a filter 186 which has a passband sufficiently narrow to extract, from the train of samples of the shift register 184, the frequency of the sinusoid of the waveform generator 178. The signal samples are provided via the D/A's 184 to each of the filters 186 at a rate at least twice the bandwidth of the filter 186 (the Nyquist rate), for example, 2½ times the bandwidth of the filter 186, to provide a signal having an accurate reconstruction of the waveform of the generator 178 by each of the filters 186. The sinusoid produced by each filter 186 is coupled to a corresponding amplifier 188 to increase the power thereof to a suitable level for transmission from the transducer 36 of the array 34 in FIG. 1. Each of the amplifiers 188 is coupled to a transducer 36 via terminal A of a channel 147, the channels 147 having been disclosed in FIG. 10.

Figure 13:
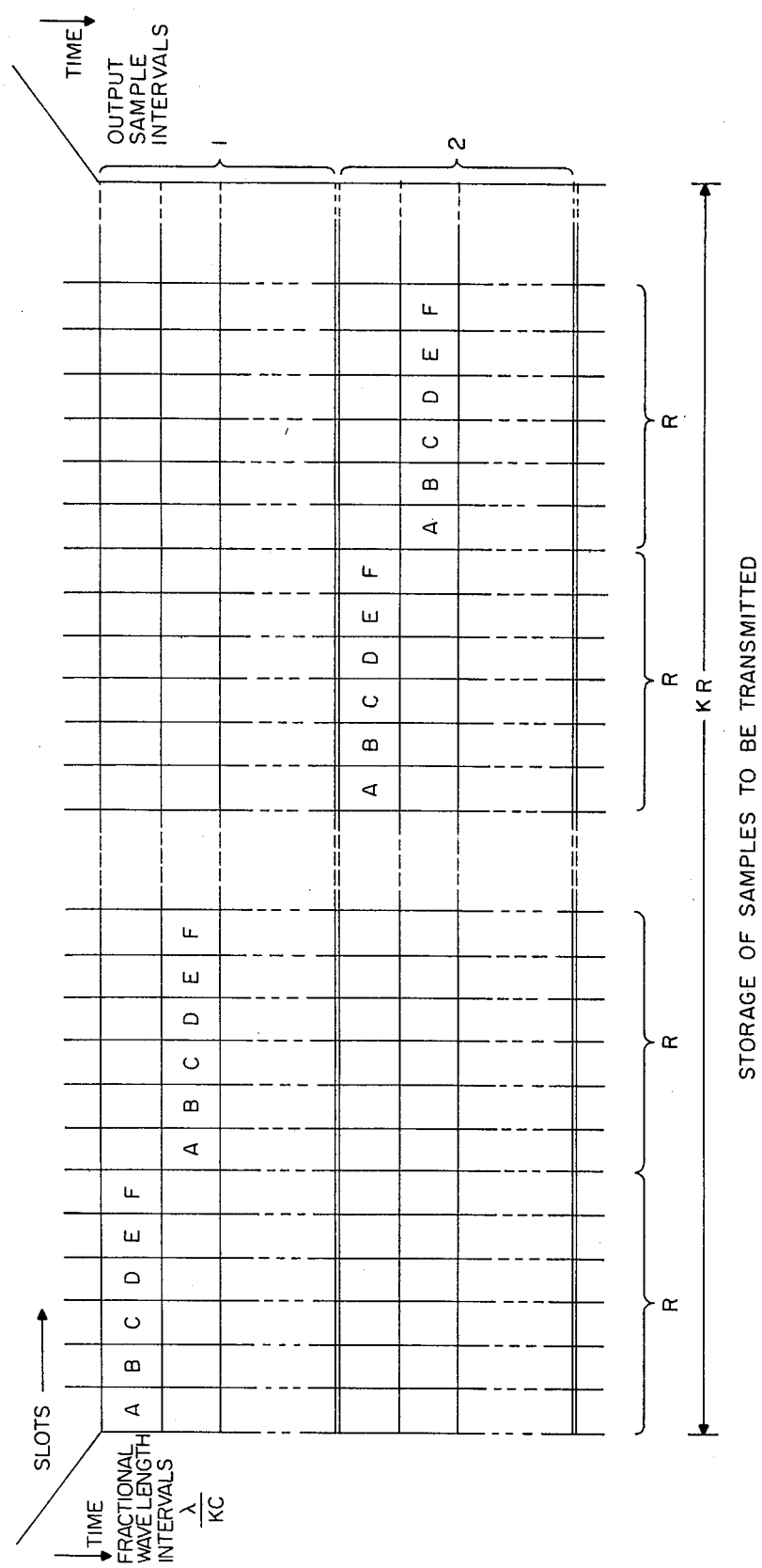
FIG. 13 is a timing diagram showing contents of a memory of FIG. 12.

Referring also to FIG. 13, there is shown a timing diagram of the memory 100. Samples of the signal to be transmitted by transducer A are seen stored in the first slot, slot numbered (R+1), slot numbered (2R+1) up to slot number [(K−1)R+1] where R is the number of transducers in the array 34 of FIG. 1, only the transducers A–F being considered in FIG. 13 by way of example. Similarly, samples of the signal to be transmitted by transducer B are stored in the second slot of each group of R slots. The term K represents the number of different signal samples to be transmitted by transducer A during an interval of time equal to the period of the wave to be transmitted by the array 34. The K intervals of time are repeated periodically at a frequency equal to the frequency of the sonic energy transmitted by transducer A, as well as by the other transducers B–F. FIG. 13 also shows a formula for the duration of each of the K intervals in terms of $\lambda$ and c where $\lambda$ is the wavelength of the sonic energy and c is the speed of propagation of the sonic energy in the medium in which the array 34 is immersed. During each of the K intervals, a wave of the sonic energy propagates a fractional wavelength, the fraction being $1/K$.

In the typical situation, the fractional wavelength intervals are smaller than an output sample interval so that, for example, several such fractional wavelength intervals may occur during one output sample interval, two output sample intervals being shown on the right hand side of FIG. 13. As was disclosed hereinabove, the number K of fractional wavelength intervals, six or more such intervals, is sufficient to insure that the radiation pattern of a beam produced by the array 34 is free of grating lobes and the grating nulls. The address generator 46A addresses the memory 100 via line 125 to sequentially select each of the slots to provide each of the transducers A–F with their respective samples. The counter 108, seen in FIG. 3 and being common to both the generators 46 and 46A, counts modulo-R and the detector 122 detects the number R. Thus, at the conclusion of the first group of R samples, the counter 116 produces a count on line 128 representing the number of fractional wavelength intervals that have been completed. As seen in FIG. 12, the number on line 128 is multiplied by R, R being provided by the source 192, with the product of the multiplication being coupled via line 128A to the adder 114. Thereby, a distinction is seen between the operation of the generator 46 of FIG. 3 and the generator 46A of FIG. 12 in that the address on line 125 of FIG. 3 increases in units of one upon the occurrence of each pulse on line 126 while in FIG. 12 the increment is in multiples of R.

Accordingly, at the conclusion of each fractional wavelength interval, the slot address is advanced so that a separate set of samples for each of the transducers A–F is provided during the next fractional wavelength interval. At the conclusion of K fractional wavelength intervals, in lieu of the M intervals of FIG. 3, the count of the counter 116 reverts to zero to repeat the sequence of the extraction of samples from the memory 100. In this way, it is seen that a signal generated by the generator 178 may be stored in the memory 100, and that the stored signal may thereafter be repetitively coupled from the memory 100 to the array of transducers for radiating a beam of sonic energy having the waveform of the stored signal. In addition, the coupling of the signal from the generator 178 via line 145 to the processor 52 of FIG. 3 permits storage of the signal in the processor to be utilized as a reference for correlation purposes as has been noted hereinabove.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A signal processor for processing a set of input signals to a set of output signals comprising:
    means for sampling said set of input signals at a predetermined output sample rate;
    means for storing sampled signals of said set of input signals, said storing means containing locations for storing individual ones representing partial sums of said set of input signals, individual ones of said locations being identified by addresses;
    means coupled to said storing means for combining, by a sequence of operations, signals of said set of input signals with signals stored in locations of said storing means at said predetermined output sample rate; and
    means coupled to said storing means for providing addresses, said addressing means including means coupled to said combining means for permuting said addresses between sequential ones of said combining operations at the predetermined sample rate of one section of said storing means per output sample interval, said permuted addresses being coupled to said storing means to produce output signals at said output sample rate.

2. A converter of a set of input signals to a set of output signals comprising:
    means for sampling said input signals to provide partial sums of said set of input signals over a predetermined sampling period;
    means for storing said partial sums of said sampled signals in a memory including a plurality of memory sections;
    address means for providing addresses to said memory for designating locations in said memory for the storing of the partial sums of said sampled signals;
    means coupled to said memory for combining by a sequence of operations said partial sums of said input signals occurring in said sampling period with the partial sums of signals stored in said memory at locations designated by said addresses to produce combined signals, an output terminal of said combining means being coupled to said memory for storing said combined signals at locations designated by said addresses;
    said combining means operating on signals of said set of input signals sequentially in a sequence of combining operations, additional ones of said signals of said set of input signals being operated on by a further sequence of said combining operations; and said combining means including means coupled to said address means for permuting said addresses at a rate of one memory section per output sample interval to combine the stored partial sums of a present sequence of input signals with partial sums of an earlier sequence previously stored in said memory thereby to produce a set of said output signals at said output terminal.

3. A converter according to claim 2 wherein said combining means includes weighting means responsive to said addresses for weighting individual ones of said input signals.

4. A converter according to claim 3 wherein said permuting means includes a counter of said sequences, and means for summing a count of said counter with the address for the said partial sums.

5. A signal processor comprising:
storage means having locations for the storage of signals, each of said locations being identified by an address;
arithmetic means;
addressing means having a programmable memory coupled to said arithmetic means for providing said addresses to said storage means for designating said locations in said storage means for the storing of signals, said programmable memory activating said arithmetic means to provide mathematical operations between each of a sequence of input signals and the signals stored in said locations designated by said addresses to provide partial sums of output signals at an output terminal of said arithmetic means, said programmable memory activating said arithmetic means to provide said operations for further sequences of said input signals;
means for storing said partial sums of said output signals at said designated locations;
means coupled to said addressing means for permuting said addresses at a rate of one memory section per output sample interval respectively for each of said sequences of input signals and thus to combine partial sums obtained during successive occurrences of said input signals with succeeding later partial sums; and
means for coupling said combined partial sums to an output terminal to produce a completed output sample.

6. A processor according to claim 5 wherein said addressing means includes a counter and said programmable memory addressed by said counter, said counter counting timing pulses and said programmable memory providing partial addresses in accordance with the count of said counter.

7. A processor according to claim 6 further comprising a timer producing said timing pulses, and circuit means responsive to said timing pulses for applying said input signals to said arithmetic means.

* * * * *

UNITED STATES PATENT OFFICE
CERTIFICATE OF CORRECTION

Patent No. 4,247,900    Dated January 27, 1981

Inventor(s) Walter J. Martin and John Furtado

It is certified that error appears in the above-identified patent and that said Letters Patent are hereby corrected as shown below:

Column 8, line 49, delete --vertically-- and replace with --vertical--;

Column 16, line 10, delete --operation-- and replace with --operations--;

Column 18, line 9, delete --Reffering-- and replace with --Referring--;

Column 19, line 44, delete --added-- and replace with --adder--;

Column 19, line 64, delete --320-- and replace with --3°--;

Column 21, line 8, delete --transducer-- and replace with --transducers--.

Signed and Sealed this

Twenty-sixth Day of May 1981

[SEAL]

Attest:

RENE D. TEGTMEYER

Attesting Officer    Acting Commissioner of Patents and Trademarks